US012437349B2

(12) United States Patent
Barbour

(10) Patent No.: US 12,437,349 B2
(45) Date of Patent: *Oct. 7, 2025

(54) BLOCKCHAIN MINING SYSTEM WITH LOAD MODULATION

(71) Applicant: Upstream Data Inc., Lloydminster (CA)

(72) Inventor: Stephen Barbour, Calgary (CA)

(73) Assignee: Upstream Data Inc., Lloydminster (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,769

(22) Filed: May 17, 2023

(65) Prior Publication Data

US 2023/0289902 A1    Sep. 14, 2023

Related U.S. Application Data

(63) Continuation of application No. 17/952,132, filed on Sep. 23, 2022, which is a continuation of application
(Continued)

(51) Int. Cl.
*G06Q 30/00* (2023.01)
*E21B 41/00* (2006.01)
(Continued)

(52) U.S. Cl.
CPC ............ *G06Q 50/06* (2013.01); *E21B 41/00* (2013.01); *F02M 21/0209* (2013.01);
(Continued)

(58) Field of Classification Search
None
See application file for complete search history.

(56) References Cited

U.S. PATENT DOCUMENTS 3,486,530 A    12/1969    Mercier
3,941,144 A    3/1976    Cornil
(Continued)

FOREIGN PATENT DOCUMENTS

AU    2009203009 A1    2/2010
AU    2014101324 A4 *    12/2014
(Continued)

OTHER PUBLICATIONS

Youtube. "Using Natural Gas to Mine Bitcoin With Matthew Lohstroh." (Sep. 18, 2019). Retrieved online Apr. 16, 2022. https://www.youtube.com/watch?v=TYpsZzlevow (Year: 2019).*
(Continued)

*Primary Examiner* — James A Reagan
(74) *Attorney, Agent, or Firm* — Robert A. Nissen

(57) ABSTRACT

Methods and systems of operating a blockchain mining device using natural gas produced at a hydrocarbon production, storage, or processing site/facility. A generator may be retrofitted to an existing prime mover used to pump the well, and the generator may be used to power the blockchain mining device. Portable mining devices may be hooked up to a casinghead gas supply at a remote, isolated oil facility. Power loading levels may be modulated by adjusting mining transaction levels to correspond with combustible gas production levels.

24 Claims, 6 Drawing Sheets

Related U.S. Application Data

No. 16/484,728, filed as application No. PCT/CA2018/050135 on Feb. 6, 2018, now Pat. No. 11,574,372.

(60) Provisional application No. 62/456,380, filed on Feb. 8, 2017.

(51) Int. Cl.

| | |
|---|---|
| *F02M 21/02* | (2006.01) |
| *G05B 15/02* | (2006.01) |
| *G06F 16/23* | (2019.01) |
| *G06Q 10/0631* | (2023.01) |
| *G06Q 50/06* | (2024.01) |
| *H02J 9/06* | (2006.01) |
| *H04L 67/104* | (2022.01) |
| *H04L 67/1097* | (2022.01) |

(52) U.S. Cl.
CPC ......... *F02M 21/0218* (2013.01); *G05B 15/02* (2013.01); *G06F 16/2315* (2019.01); *G06Q 10/06313* (2013.01); *H04L 67/104* (2013.01); *H04L 67/1097* (2013.01); *G06Q 2220/00* (2013.01); *H02J 9/06* (2013.01)

(56) References Cited

U.S. PATENT DOCUMENTS

| | | |
|---|---|---|
| 4,088,154 A | 5/1978 | Patton |
| 4,106,097 A | 8/1978 | Fox |
| 4,245,319 A | 1/1981 | Hedges |
| 4,247,786 A | 1/1981 | Hedges |
| 4,333,496 A | 6/1982 | Chow |
| 4,371,779 A | 2/1983 | Maynard |
| 4,551,812 A | 11/1985 | Gurr |
| 4,574,959 A | 3/1986 | Hollett |
| 4,712,170 A * | 12/1987 | Grace ................ H05B 41/282 |
| | | 315/DIG. 7 |
| 5,142,672 A | 8/1992 | Johnson |
| 5,209,317 A | 5/1993 | Schnelle |
| 5,355,676 A | 10/1994 | Inokuchi |
| 5,367,669 A | 11/1994 | Holland |
| 5,396,923 A | 3/1995 | Allen |
| 5,509,434 A | 4/1996 | Boyd |
| 5,544,012 A | 8/1996 | Koike |
| 5,544,046 A | 8/1996 | Niwa |
| 5,586,574 A | 12/1996 | Smith |
| 5,653,070 A | 8/1997 | Seguin |
| 5,748,914 A | 5/1998 | Barth |
| 5,761,083 A | 6/1998 | Brown |
| 5,913,046 A | 6/1999 | Barth |
| 5,943,221 A | 8/1999 | Asai |
| 6,042,791 A | 3/2000 | Johnson |
| 6,115,698 A | 9/2000 | Tuck |
| 6,161,386 A | 12/2000 | Lokhandwala |
| 6,244,516 B1 | 6/2001 | Langervik |
| 6,288,456 B1 | 9/2001 | Cratty |
| 6,304,459 B1 | 10/2001 | Toyosato |
| 6,437,692 B1 | 8/2002 | Petite |
| 6,473,744 B1 | 10/2002 | Tuck |
| 6,519,509 B1 | 2/2003 | Nierlich |
| 6,521,020 B2 | 2/2003 | Butwell |
| 6,585,784 B1 | 7/2003 | Mittricker |
| 6,618,709 B1 | 9/2003 | Sneeringer |
| 6,633,823 B2 | 10/2003 | Bartone |
| 6,643,567 B2 | 11/2003 | Kolk |
| 6,665,582 B1 | 12/2003 | Moritz |
| 6,672,955 B2 | 1/2004 | Charron |
| 6,681,154 B2 | 1/2004 | Nierlich |
| 6,745,105 B1 | 6/2004 | Fairlie |
| 6,748,932 B1 | 6/2004 | Sorter |
| 6,775,595 B1 | 8/2004 | Yabutani |
| 6,785,592 B1 | 8/2004 | Smith |
| 6,853,930 B2 | 2/2005 | Hayashi |
| 6,868,293 B1 | 3/2005 | Schurr |
| 6,912,450 B2 | 6/2005 | Fairlie |
| 6,930,410 B2 | 8/2005 | Ikeda |
| 6,990,593 B2 | 1/2006 | Nakagawa |
| 7,010,363 B2 | 3/2006 | Donnelly |
| 7,027,992 B2 | 4/2006 | Zaccaria |
| 7,035,179 B2 | 4/2006 | Chen |
| 7,042,726 B2 | 5/2006 | Cader |
| 7,053,767 B2 | 5/2006 | Petite |
| 7,054,271 B2 | 5/2006 | Brownrigg |
| 7,062,360 B2 | 6/2006 | Fairlie |
| 7,076,339 B2 | 7/2006 | Yabutani |
| 7,085,133 B2 | 8/2006 | Hall |
| 7,088,014 B2 | 8/2006 | Nierlich |
| 7,093,256 B2 | 8/2006 | Bloks |
| 7,127,328 B2 | 10/2006 | Ransom |
| 7,130,832 B2 | 10/2006 | Bannai |
| 7,135,956 B2 | 11/2006 | Bartone |
| 7,143,300 B2 | 11/2006 | Potter |
| 7,149,605 B2 | 12/2006 | Chassin |
| 7,181,316 B2 | 2/2007 | Fairlie |
| 7,188,003 B2 | 3/2007 | Ransom |
| 7,196,900 B2 | 3/2007 | Ewing |
| 7,206,670 B2 | 4/2007 | Pimputkar |
| 7,269,723 B2 | 9/2007 | Cromer |
| 7,278,273 B1 | 10/2007 | Whitted |
| 7,305,282 B2 | 12/2007 | Chen |
| 7,333,880 B2 | 2/2008 | Brewster |
| 7,369,968 B2 | 5/2008 | Johnson |
| 7,370,666 B2 | 5/2008 | Willets |
| 7,376,851 B2 | 5/2008 | Kim |
| 7,386,744 B2 | 6/2008 | Barr |
| 7,396,388 B2 | 7/2008 | Mitariten |
| 7,420,293 B2 | 9/2008 | Donnelly |
| 7,460,930 B1 | 12/2008 | Howell |
| 7,468,661 B2 | 12/2008 | Petite |
| 7,484,521 B2 | 2/2009 | Kimbara |
| 7,500,911 B2 | 3/2009 | Johnson |
| 7,508,663 B2 | 3/2009 | Coglitore |
| 7,516,106 B2 | 4/2009 | Ehlers |
| 7,519,453 B2 | 4/2009 | Fairlie |
| 7,525,207 B2 * | 4/2009 | Clidaras ................ F03B 13/20 |
| | | 290/43 |
| 7,542,947 B2 | 6/2009 | Guyon |
| 7,560,831 B2 | 7/2009 | Whitted |
| 7,561,977 B2 | 7/2009 | Horst |
| 7,565,224 B2 | 7/2009 | Fairlie |
| 7,633,955 B1 | 12/2009 | Saraiya |
| 7,647,516 B2 | 1/2010 | Ranganathan |
| 7,702,931 B2 | 4/2010 | Goodrum |
| 7,724,513 B2 | 5/2010 | Coglitore |
| 7,738,251 B2 | 6/2010 | Clidaras |
| 7,779,276 B2 | 8/2010 | Bolan |
| 7,783,907 B2 | 8/2010 | Dubinsky |
| 7,800,900 B1 | 9/2010 | Noteboom |
| 7,854,652 B2 | 12/2010 | Yates |
| 7,861,102 B1 | 12/2010 | Ranganathan |
| 7,862,410 B2 | 1/2011 | McMahan |
| 7,921,315 B2 | 4/2011 | Langgood |
| 7,925,911 B2 | 4/2011 | Brey |
| 7,944,692 B2 | 5/2011 | Grantham |
| 7,957,142 B2 | 6/2011 | Noteboom |
| 7,961,463 B2 | 6/2011 | Belady |
| 7,970,561 B2 | 6/2011 | Pfeiffer |
| 7,971,446 B2 | 7/2011 | Clidaras |
| 7,990,710 B2 | 8/2011 | Hellriegel |
| 7,998,227 B2 | 8/2011 | Mittricker |
| 8,001,403 B2 | 8/2011 | Hamilton |
| 8,006,108 B2 | 8/2011 | Brey |
| 8,031,468 B2 | 10/2011 | Bean |
| 8,047,904 B2 | 11/2011 | Yates |
| 8,051,672 B2 | 11/2011 | Mallia |
| 8,070,863 B2 | 12/2011 | Tsangaris |
| 8,080,900 B2 | 12/2011 | Corhodzic |
| 8,094,436 B2 | 1/2012 | Mills |
| 8,113,010 B2 | 2/2012 | Carlson |
| 8,156,206 B2 | 4/2012 | Kiley |
| 8,180,501 B2 | 5/2012 | Lewis |
| 8,184,435 B2 | 5/2012 | Bean |

(56) References Cited

U.S. PATENT DOCUMENTS

| | | | |
|---|---|---|---|
| 8,203,837 B2 | 6/2012 | Zeighami | |
| 8,203,841 B2 | 6/2012 | Chang | |
| 8,214,843 B2 | 7/2012 | Boss | |
| 8,233,270 B2 | 7/2012 | Pierson | |
| 8,248,795 B2 | 8/2012 | Chang | |
| 8,248,799 B2 | 8/2012 | Chang | |
| 8,250,382 B2 | 8/2012 | Maglione | |
| 8,251,785 B2 | 8/2012 | Schmitt | |
| 8,254,122 B2 | 8/2012 | Chang | |
| 8,254,124 B2 | 8/2012 | Keisling | |
| 8,260,913 B2 | 9/2012 | Knapp | |
| 8,261,275 B2 | 9/2012 | Johnson | |
| 8,264,840 B2 | 9/2012 | Bergthold | |
| 8,286,442 B2 | 10/2012 | Carlson | |
| 8,297,067 B2 | 10/2012 | Keisling | |
| 8,300,402 B2 | 10/2012 | Wei | |
| 8,305,737 B2 | 11/2012 | Ewing | |
| 8,305,757 B2 | 11/2012 | Keisling | |
| 8,312,229 B2 | 11/2012 | Bloks | |
| 8,315,054 B2 | 11/2012 | Chen | |
| 8,320,128 B2 | 11/2012 | Wei | |
| 8,322,155 B2 | 12/2012 | Tutunoglu | |
| 8,327,123 B2 | 12/2012 | Juffa | |
| 8,331,086 B1 | 12/2012 | Meissner | |
| 8,331,087 B2 | 12/2012 | Wei | |
| 8,332,670 B2 | 12/2012 | Kato | |
| 8,360,833 B2 | 1/2013 | Grantham | |
| 8,370,517 B2 | 2/2013 | Bohrer | |
| 8,374,928 B2 | 2/2013 | Gopisetty | |
| 8,405,977 B2 | 3/2013 | Lin | |
| 8,422,223 B2 | 4/2013 | Su | |
| 8,432,700 B2 | 4/2013 | Katakura | |
| 8,447,993 B2 | 5/2013 | Greene | |
| 8,457,796 B2 | 6/2013 | Thind | |
| 8,462,496 B2 | 6/2013 | Schmitt | |
| 8,467,050 B2 | 6/2013 | Dutel | |
| 8,483,715 B2 | 7/2013 | Chen | |
| 8,498,110 B2 | 7/2013 | Wei | |
| 8,498,114 B2 | 7/2013 | Martini | |
| 8,571,820 B2 | 10/2013 | Pfeiffer | |
| 8,577,509 B2 | 11/2013 | Ong | |
| 8,595,094 B1 | 11/2013 | Forbes | |
| 8,595,515 B1 | 11/2013 | Weber | |
| 8,600,556 B2 | 12/2013 | Nesler | |
| 8,601,287 B1 | 12/2013 | Weber | |
| 8,601,827 B2 | 12/2013 | Keisling | |
| 8,627,123 B2 | 1/2014 | Jain | |
| 8,639,392 B2 | 1/2014 | Chassin | |
| 8,659,895 B1 | 2/2014 | Carlson | |
| 8,665,591 B2 | 3/2014 | Bourgeois | |
| 8,683,823 B1* | 4/2014 | Shivers, III | F25J 1/0283 114/230.17 |
| 8,692,537 B2* | 4/2014 | Hyde | G05F 1/14 323/361 |
| 8,694,810 B2 | 4/2014 | Ahluwalia | |
| 8,700,929 B1 | 4/2014 | Weber | |
| 8,706,914 B2 | 4/2014 | Duchesneau | |
| 8,706,915 B2 | 4/2014 | Duchesneau | |
| 8,719,223 B2 | 5/2014 | Knapp | |
| 8,734,212 B2 | 5/2014 | Peng | |
| 8,755,184 B2 | 6/2014 | Peng | |
| 8,768,799 B1 | 7/2014 | Forbes | |
| 8,789,061 B2 | 7/2014 | Pavel | |
| 8,799,690 B2 | 8/2014 | Dawson | |
| 8,812,674 B2 | 8/2014 | Guenter | |
| 8,839,254 B2 | 9/2014 | Horvitz | |
| 8,839,551 B2 | 9/2014 | Swann | |
| 8,848,727 B2 | 9/2014 | Saraiya | |
| 8,849,469 B2* | 9/2014 | Belady | G06Q 30/04 700/297 |
| 8,849,715 B2 | 9/2014 | Forbes | |
| 8,887,498 B2 | 11/2014 | Frerichs | |
| 8,917,502 B1 | 12/2014 | Gardner | |
| 8,924,781 B2 | 12/2014 | Shaw | |
| 8,930,299 B2 | 1/2015 | Pyle | |
| 8,931,221 B2 | 1/2015 | Somani | |
| 8,941,256 B1 | 1/2015 | Czamara | |
| 8,964,374 B1 | 2/2015 | Sheng | |
| 8,965,594 B2 | 2/2015 | Marcus | |
| 9,003,211 B2 | 4/2015 | Pfeiffer | |
| 9,003,216 B2 | 4/2015 | Sankar | |
| 9,026,814 B2 | 5/2015 | Aasheim | |
| 9,027,024 B2 | 5/2015 | Mick | |
| 9,041,235 B1 | 5/2015 | Hunter | |
| 9,059,604 B2 | 6/2015 | Johnson | |
| 9,063,738 B2 | 6/2015 | Jain | |
| 9,065,582 B2 | 6/2015 | Barry | |
| 9,072,200 B2 | 6/2015 | Dersch | |
| 9,089,078 B2* | 7/2015 | Branton | H05K 7/20263 |
| 9,091,496 B2 | 7/2015 | Imwalle | |
| 9,110,641 B2 | 8/2015 | Wu | |
| 9,124,099 B2 | 9/2015 | Kuriyama | |
| 9,141,155 B2 | 9/2015 | Wiley | |
| 9,143,392 B2 | 9/2015 | Duchesneau | |
| 9,144,181 B2 | 9/2015 | Wiley | |
| 9,155,230 B2* | 10/2015 | Eriksen | H05K 7/20781 |
| 9,207,993 B2 | 12/2015 | Jain | |
| 9,218,035 B2 | 12/2015 | Li | |
| 9,232,024 B2 | 1/2016 | Suffling | |
| 9,252,598 B2 | 2/2016 | Belady | |
| 9,268,613 B2 | 2/2016 | Barham | |
| 9,271,429 B2 | 2/2016 | Mashiko | |
| 9,282,022 B2 | 3/2016 | Matthews | |
| 9,282,684 B2 | 3/2016 | Keisling | |
| 9,284,850 B1 | 3/2016 | Gardner | |
| 9,320,177 B2 | 4/2016 | Levesque | |
| 9,337,704 B1 | 5/2016 | Leslie | |
| 9,342,375 B2 | 5/2016 | Hyser | |
| 9,345,167 B2 | 5/2016 | Hwang | |
| 9,348,381 B2 | 5/2016 | Khoo | |
| 9,357,681 B2 | 5/2016 | Ross | |
| 9,363,928 B2 | 6/2016 | Kondo | |
| 9,365,127 B2 | 6/2016 | Olsson | |
| 9,380,734 B2 | 6/2016 | Chang | |
| 9,389,632 B2 | 7/2016 | Km | |
| 9,394,770 B2 | 7/2016 | Boot | |
| 9,395,208 B2 | 7/2016 | Sobotka | |
| 9,414,531 B1 | 8/2016 | Towner | |
| 9,416,904 B2 | 8/2016 | Belady | |
| 9,444,367 B2 | 9/2016 | Fornage | |
| 9,447,992 B2 | 9/2016 | Johnson | |
| 9,450,838 B2 | 9/2016 | Jain | |
| 9,477,279 B1 | 10/2016 | Piszczek | |
| 9,493,216 B2* | 11/2016 | Scott | F17C 9/00 |
| 9,495,668 B1 | 11/2016 | Juels | |
| 9,497,892 B2 | 11/2016 | Klaba | |
| 9,542,231 B2 | 1/2017 | Khan | |
| 9,552,234 B2 | 1/2017 | Boldyrev | |
| 9,557,792 B1 | 1/2017 | Potlapally | |
| 9,559,520 B2 | 1/2017 | Shelton | |
| 9,568,975 B2 | 2/2017 | Sehgal | |
| 9,585,291 B2 | 2/2017 | Belady | |
| 9,588,558 B2 | 3/2017 | McKnight | |
| 9,595,054 B2 | 3/2017 | Jain | |
| 9,606,571 B2 | 3/2017 | Shows | |
| 9,618,991 B1 | 4/2017 | Clidaras | |
| 9,622,387 B1 | 4/2017 | Czamara | |
| 9,630,614 B1* | 4/2017 | Hill | F02B 63/047 |
| 9,634,508 B2 | 4/2017 | Kearns | |
| 9,637,433 B2 | 5/2017 | Zubrin | |
| 9,645,596 B1 | 5/2017 | Lee | |
| 9,654,414 B2 | 5/2017 | Chatterjee | |
| 9,673,632 B1 | 6/2017 | Ramesh | |
| 9,692,259 B2 | 6/2017 | Boss | |
| 9,719,024 B2 | 8/2017 | Young | |
| 9,763,366 B2 | 9/2017 | Keisling | |
| 9,769,948 B2 | 9/2017 | Welch | |
| 9,769,953 B2 | 9/2017 | Malone | |
| 9,769,960 B2 | 9/2017 | LeFebvre | |
| 9,774,190 B2 | 9/2017 | Mondal | |
| 9,778,718 B2 | 10/2017 | Zacho | |
| 9,795,062 B1 | 10/2017 | Ross | |
| 9,800,052 B2 | 10/2017 | Li | |
| 9,800,167 B2 | 10/2017 | Aeloiza | |

(56) References Cited

U.S. PATENT DOCUMENTS

| | | | |
|---|---|---|---|
| 9,839,163 B2 | 12/2017 | Keisling | |
| 9,843,470 B1 | 12/2017 | Gartrell | |
| 9,886,316 B2 | 2/2018 | Belady | |
| 9,929,591 B2 | 3/2018 | Cheng | |
| 9,933,804 B2 | 4/2018 | Janous | |
| 9,939,834 B2 | 4/2018 | Bodas | |
| 9,946,815 B1 | 4/2018 | Weber | |
| 9,967,333 B2 | 5/2018 | Chen | |
| 9,982,516 B2* | 5/2018 | Ricotta | C10G 7/02 |
| 9,985,842 B2 | 5/2018 | White | |
| 9,994,118 B2 | 6/2018 | Williams | |
| 9,995,218 B2 | 6/2018 | Oehring | |
| 10,003,200 B2 | 6/2018 | Budde | |
| 10,009,232 B2 | 6/2018 | Duncan | |
| 10,013,037 B1 | 7/2018 | Clidaras | |
| 10,033,210 B2 | 7/2018 | Peterson | |
| 10,037,061 B1 | 7/2018 | Panchapakesan | |
| 10,039,211 B2 | 7/2018 | Crawford | |
| 10,063,629 B2 | 8/2018 | Duncan | |
| 10,067,547 B2 | 9/2018 | Castro-Leon | |
| 10,078,353 B2 | 9/2018 | Klaba | |
| 10,101,731 B2 | 10/2018 | Asmus | |
| 10,103,574 B2 | 10/2018 | Siegler | |
| 10,111,275 B2 | 10/2018 | Norton | |
| 10,128,684 B2 | 11/2018 | Ramamurthy | |
| 10,199,669 B2 | 2/2019 | Wang | |
| 10,234,835 B2 | 3/2019 | Liu | |
| 10,250,039 B2 | 4/2019 | Wenzel | |
| 10,257,268 B2 | 4/2019 | Cencini | |
| 10,271,486 B2 | 4/2019 | McNamara | |
| 10,275,842 B2 | 4/2019 | Lee | |
| 10,283,968 B2 | 5/2019 | ElBsat | |
| 10,289,190 B2 | 5/2019 | Boss | |
| 10,291,627 B2* | 5/2019 | Gleichauf | H04W 12/06 |
| 10,299,412 B1 | 5/2019 | Papen | |
| 10,326,661 B2 | 6/2019 | Munjal | |
| 10,339,227 B1 | 7/2019 | Carlson | |
| 10,340,696 B2 | 7/2019 | Paine | |
| 10,356,954 B2 | 7/2019 | Bao | |
| 10,360,077 B2 | 7/2019 | Mahindru | |
| 10,367,335 B2 | 7/2019 | Kawashima | |
| 10,367,353 B1* | 7/2019 | McNamara | G06F 1/3206 |
| 10,367,535 B2 | 7/2019 | Corse | |
| 10,368,467 B2 | 7/2019 | Gold | |
| 10,404,523 B2 | 9/2019 | Cencini | |
| 10,444,818 B1 | 10/2019 | McNamara | |
| 10,452,041 B2 | 10/2019 | Menon | |
| 10,452,127 B1 | 10/2019 | McNamara | |
| 10,452,532 B2 | 10/2019 | McVay | |
| 10,454,772 B2 | 10/2019 | White | |
| 10,465,492 B2 | 11/2019 | Ricotta | |
| 10,476,386 B2 | 11/2019 | Goto | |
| 10,488,061 B2 | 11/2019 | Costakis | |
| 10,497,072 B2 | 12/2019 | Hooshmand | |
| 10,511,175 B2 | 12/2019 | Kogo | |
| 10,523,449 B2 | 12/2019 | Montalvo | |
| 10,545,560 B2 | 1/2020 | Mahindru | |
| 10,545,796 B2 | 1/2020 | Bahramshahry | |
| 10,582,635 B1 | 3/2020 | Ross | |
| 10,608,433 B1 | 3/2020 | McNamara | |
| 10,618,427 B1 | 4/2020 | McNamara | |
| 10,637,250 B2 | 4/2020 | Paine | |
| 10,637,353 B2 | 4/2020 | Ohyama | |
| 10,709,076 B2 | 7/2020 | Pham | |
| 10,721,240 B2* | 7/2020 | Gleichauf | H04L 67/1097 |
| 10,739,042 B2 | 8/2020 | Zhang | |
| 10,754,494 B2 | 8/2020 | Duncan | |
| 10,756,546 B2 | 8/2020 | Pmsvvsv | |
| 10,756,570 B2 | 8/2020 | Lundstrom | |
| 10,757,840 B2 | 8/2020 | Johnson | |
| 10,762,476 B2 | 9/2020 | Son | |
| 10,779,441 B2 | 9/2020 | Martini | |
| 10,795,428 B2 | 10/2020 | Walsh | |
| 10,819,599 B2 | 10/2020 | Mahindru | |
| 10,822,992 B2 | 11/2020 | Spears | |
| 10,831,555 B2 | 11/2020 | Krishnan | |
| 10,833,940 B2 | 11/2020 | Cencini | |
| 10,834,838 B1 | 11/2020 | Ross | |
| 10,838,482 B2 | 11/2020 | Mahindru | |
| 10,857,299 B2 | 12/2020 | Creaturo | |
| 10,857,899 B1 | 12/2020 | McNamara | |
| 10,861,112 B2 | 12/2020 | Forbes | |
| 10,862,307 B2 | 12/2020 | Cavness | |
| 10,862,309 B2 | 12/2020 | Cavness | |
| 10,873,211 B2 | 12/2020 | McNamara | |
| 10,882,412 B2 | 1/2021 | Mrlik | |
| 10,892,622 B2 | 1/2021 | Guruprasad | |
| 10,916,967 B2 | 2/2021 | Peloso | |
| 10,931,117 B2 | 2/2021 | Shoemaker | |
| 10,974,194 B2 | 4/2021 | Al Muhsen | |
| 10,993,353 B2 | 4/2021 | Rau | |
| 11,009,836 B2 | 5/2021 | Hoffmann | |
| 11,016,456 B2 | 5/2021 | Henson | |
| 11,016,458 B2 | 5/2021 | McNamara | |
| 11,016,553 B2 | 5/2021 | McNamara | |
| 11,025,060 B2 | 6/2021 | McNamara | |
| 11,031,783 B2 | 6/2021 | McNamara | |
| 11,031,787 B2 | 6/2021 | McNamara | |
| 11,031,813 B2 | 6/2021 | McNamara | |
| 11,042,948 B1 | 6/2021 | McNamara | |
| 11,056,913 B2 | 7/2021 | Matan | |
| 11,076,509 B2 | 7/2021 | Alissa | |
| 11,108,237 B2 | 8/2021 | Clifton | |
| 11,126,242 B2 | 9/2021 | Shaikh | |
| 11,128,165 B2 | 9/2021 | McNamara | |
| 11,162,696 B2 | 11/2021 | Klaba | |
| 11,163,280 B2* | 11/2021 | Henson | A01G 9/26 |
| 11,169,592 B2 | 11/2021 | Mahindru | |
| 11,182,781 B2 | 11/2021 | Castinado | |
| 11,194,150 B2 | 12/2021 | Baba | |
| 11,196,255 B2 | 12/2021 | Torvund | |
| 11,256,320 B2 | 2/2022 | McNamara | |
| 11,268,715 B2 | 3/2022 | Park | |
| 11,275,427 B2 | 3/2022 | McNamara | |
| 11,283,261 B2 | 3/2022 | McNamara | |
| 11,289,914 B2 | 3/2022 | Walsh | |
| 11,306,970 B2 | 4/2022 | Klaba | |
| 11,310,944 B2 | 4/2022 | Martini | |
| 11,327,473 B2 | 5/2022 | Sayyarrodsari | |
| 11,337,339 B2 | 5/2022 | Pichai | |
| 11,342,746 B2 | 5/2022 | McNamara | |
| 11,359,865 B2 | 6/2022 | Stone | |
| 11,397,999 B2 | 7/2022 | McNamara | |
| 11,418,037 B2 | 8/2022 | Cavness | |
| 11,431,195 B2 | 8/2022 | McNamara | |
| 11,451,059 B2 | 9/2022 | Cavness | |
| 11,537,183 B2 | 12/2022 | Lewis | |
| 11,647,605 B2 | 5/2023 | Johnson | |
| 11,650,639 B2 | 5/2023 | McNamara | |
| 11,669,144 B2 | 6/2023 | McNamara | |
| 11,669,920 B2 | 6/2023 | McNamara | |
| 11,767,274 B1* | 9/2023 | Merrill | C07C 1/0495 585/240 |
| 2002/0072868 A1 | 6/2002 | Bartone | |
| 2002/0120412 A1* | 8/2002 | Hayashi | H02J 3/00 702/61 |
| 2002/0158749 A1 | 10/2002 | Ikeda | |
| 2002/0196124 A1 | 12/2002 | Howard | |
| 2003/0023885 A1 | 1/2003 | Potter | |
| 2003/0037150 A1 | 2/2003 | Nakagawa | |
| 2003/0050003 A1 | 3/2003 | Charron | |
| 2003/0056839 A1 | 3/2003 | Kroupa | |
| 2003/0074464 A1 | 4/2003 | Bohrer | |
| 2003/0171851 A1 | 9/2003 | Brickfield | |
| 2003/0196798 A1 | 10/2003 | Newman | |
| 2004/0000815 A1 | 1/2004 | Pereira | |
| 2004/0027004 A1 | 2/2004 | Bayoumi | |
| 2004/0046458 A1* | 3/2004 | MacKay | H02J 9/062 307/80 |
| 2004/0117330 A1 | 6/2004 | Ehlers | |
| 2004/0239499 A1 | 12/2004 | Crook | |
| 2005/0005528 A1 | 1/2005 | Brault | |
| 2005/0022967 A1 | 2/2005 | Hall | |
| 2005/0034128 A1 | 2/2005 | Nagashima | |

(56) References Cited

U.S. PATENT DOCUMENTS

| | | | |
|---|---|---|---|
| 2005/0102068 A1 | 5/2005 | Pimputkar | |
| 2005/0102539 A1 | 5/2005 | Hepner | |
| 2005/0154499 A1 | 7/2005 | Aldridge | |
| 2005/0165512 A1 | 7/2005 | Peljto | |
| 2005/0168945 A1 | 8/2005 | Coglitore | |
| 2005/0179263 A1 | 8/2005 | Johansen | |
| 2005/0200205 A1 | 9/2005 | Winn | |
| 2005/0203761 A1 | 9/2005 | Barr | |
| 2005/0259383 A1 | 11/2005 | Ewing | |
| 2006/0031180 A1 | 2/2006 | Tamarkin | |
| 2006/0059772 A1 | 3/2006 | Brault | |
| 2006/0140747 A1 | 6/2006 | Vandervort | |
| 2006/0161765 A1 | 7/2006 | Cromer | |
| 2006/0248360 A1* | 11/2006 | Fung | G06F 1/3296 713/300 |
| 2006/0253675 A1 | 11/2006 | Johannes Bloks | |
| 2007/0067657 A1 | 3/2007 | Ranganathan | |
| 2007/0171613 A1 | 7/2007 | McMahan | |
| 2007/0228837 A1 | 10/2007 | Nielsen | |
| 2007/0278860 A1 | 12/2007 | Krieger | |
| 2008/0000151 A1 | 1/2008 | Houweling | |
| 2008/0013596 A1 | 1/2008 | Dunne | |
| 2008/0030078 A1 | 2/2008 | Whitted | |
| 2008/0064317 A1 | 3/2008 | Yates | |
| 2008/0082844 A1 | 4/2008 | Ghiasi | |
| 2008/0094797 A1 | 4/2008 | Coglitore | |
| 2008/0135238 A1* | 6/2008 | Cugnet | E21B 41/005 166/256 |
| 2008/0238195 A1 | 10/2008 | Shaver | |
| 2008/0244052 A1 | 10/2008 | Bradicich | |
| 2008/0245083 A1 | 10/2008 | Tutunoglu | |
| 2008/0276628 A1 | 11/2008 | Lee | |
| 2009/0009090 A1* | 1/2009 | Viol | H05H 1/2406 315/111.21 |
| 2009/0012523 A1 | 1/2009 | Ruuttu | |
| 2009/0055665 A1 | 2/2009 | Maglione | |
| 2009/0070611 A1 | 3/2009 | Bower | |
| 2009/0078401 A1 | 3/2009 | Cichanowicz | |
| 2009/0089595 A1 | 4/2009 | Brey | |
| 2009/0107671 A1 | 4/2009 | Waters | |
| 2009/0144566 A1 | 6/2009 | Bletsch | |
| 2009/0216910 A1 | 8/2009 | Duchesneau | |
| 2009/0235097 A1 | 9/2009 | Hamilton | |
| 2009/0251860 A1 | 10/2009 | Belady | |
| 2009/0254660 A1 | 10/2009 | Hanson | |
| 2009/0255653 A1 | 10/2009 | Mills | |
| 2009/0282274 A1 | 11/2009 | Langgood | |
| 2010/0024445 A1 | 2/2010 | Cichanowicz | |
| 2010/0038907 A1 | 2/2010 | Hunt | |
| 2010/0057271 A1 | 3/2010 | Lewis | |
| 2010/0058350 A1 | 3/2010 | Boss | |
| 2010/0088261 A1 | 4/2010 | Montalvo | |
| 2010/0130117 A1 | 5/2010 | Larsen | |
| 2010/0170277 A1 | 7/2010 | Schmitt | |
| 2010/0211810 A1 | 8/2010 | Zacho | |
| 2010/0235004 A1 | 9/2010 | Thind | |
| 2010/0280675 A1 | 11/2010 | Tate | |
| 2010/0290197 A1 | 11/2010 | Bergthold | |
| 2010/0313203 A1 | 12/2010 | Dawson | |
| 2010/0319747 A1* | 12/2010 | Wong | H01L 35/30 136/201 |
| 2010/0324962 A1 | 12/2010 | Nesler | |
| 2010/0328849 A1 | 12/2010 | Ewing | |
| 2010/0332272 A1* | 12/2010 | Ong | F03D 17/00 705/7.36 |
| 2010/0333113 A1 | 12/2010 | Johnson | |
| 2011/0009047 A1 | 1/2011 | Noteboom | |
| 2011/0072289 A1 | 3/2011 | Kato | |
| 2011/0099043 A1 | 4/2011 | Sharma | |
| 2011/0115425 A1 | 5/2011 | Olsson | |
| 2011/0123036 A1 | 5/2011 | Barath | |
| 2011/0189936 A1 | 8/2011 | Haspers | |
| 2011/0199862 A1 | 8/2011 | Pop | |
| 2011/0235244 A1 | 9/2011 | Mills | |
| 2011/0238342 A1 | 9/2011 | Pfeiffer | |
| 2011/0239015 A1 | 9/2011 | Boyd | |
| 2011/0242755 A1 | 10/2011 | Zeighami | |
| 2011/0247348 A1 | 10/2011 | Mashiko | |
| 2011/0273835 A1 | 11/2011 | Katakura | |
| 2011/0276194 A1 | 11/2011 | Emalfarb | |
| 2011/0278928 A1 | 11/2011 | Burger | |
| 2011/0282982 A1 | 11/2011 | Jain | |
| 2011/0316337 A1 | 12/2011 | Pelio | |
| 2012/0000121 A1 | 1/2012 | Swann | |
| 2012/0006507 A1 | 1/2012 | Su | |
| 2012/0020014 A1 | 1/2012 | Chang | |
| 2012/0024515 A1 | 2/2012 | Wei | |
| 2012/0026679 A1 | 2/2012 | Chang | |
| 2012/0032665 A1 | 2/2012 | Shaver | |
| 2012/0044631 A1 | 2/2012 | Wei | |
| 2012/0044632 A1 | 2/2012 | Wei | |
| 2012/0063082 A1 | 3/2012 | Chang | |
| 2012/0072745 A1 | 3/2012 | Ahluwalia | |
| 2012/0075794 A1 | 3/2012 | Wei | |
| 2012/0077427 A1 | 3/2012 | Wei | |
| 2012/0078430 A1 | 3/2012 | Fan | |
| 2012/0103558 A1 | 5/2012 | Fernandez | |
| 2012/0103843 A1 | 5/2012 | Wei | |
| 2012/0108157 A1 | 5/2012 | Chan | |
| 2012/0109705 A1 | 5/2012 | Belady | |
| 2012/0127653 A1 | 5/2012 | Keisling | |
| 2012/0129442 A1 | 5/2012 | Wei | |
| 2012/0132554 A1 | 5/2012 | Wei | |
| 2012/0134105 A1 | 5/2012 | Chang | |
| 2012/0134107 A1 | 5/2012 | Peng | |
| 2012/0142265 A1 | 6/2012 | Wei | |
| 2012/0150679 A1 | 6/2012 | Lazaris | |
| 2012/0162886 A1 | 6/2012 | Chen | |
| 2012/0168141 A1 | 7/2012 | Lin | |
| 2012/0185414 A1* | 7/2012 | Pyle | G01W 1/10 706/11 |
| 2012/0201003 A1 | 8/2012 | Shimasaki | |
| 2012/0212901 A1 | 8/2012 | Schmitt | |
| 2012/0244793 A1 | 9/2012 | Lin | |
| 2012/0276834 A1 | 11/2012 | Peng | |
| 2012/0290865 A1 | 11/2012 | Kansal | |
| 2012/0300291 A1 | 11/2012 | Abbott | |
| 2012/0300391 A1 | 11/2012 | Keisling | |
| 2012/0300524 A1 | 11/2012 | Fornage | |
| 2012/0306271 A1 | 12/2012 | Kuriyama | |
| 2012/0321309 A1 | 12/2012 | Barry | |
| 2012/0323382 A1 | 12/2012 | Kamel | |
| 2012/0323396 A1 | 12/2012 | Shelton | |
| 2012/0324245 A1 | 12/2012 | Sinha | |
| 2012/0324259 A1 | 12/2012 | Aasheim | |
| 2012/0326511 A1 | 12/2012 | Johnson | |
| 2013/0002443 A1 | 1/2013 | Breed | |
| 2013/0006401 A1 | 1/2013 | Shan | |
| 2013/0007515 A1 | 1/2013 | Shaw | |
| 2013/0050923 A1 | 2/2013 | Wei | |
| 2013/0054987 A1 | 2/2013 | Pfeiffer | |
| 2013/0063991 A1 | 3/2013 | Xiao | |
| 2013/0065669 A1 | 3/2013 | Michaelson | |
| 2013/0078901 A1 | 3/2013 | Curtin | |
| 2013/0086404 A1 | 4/2013 | Sankar | |
| 2013/0110296 A1 | 5/2013 | Khoo | |
| 2013/0111494 A1* | 5/2013 | Hyser | G06F 9/5094 718/105 |
| 2013/0112419 A1 | 5/2013 | DeFosse | |
| 2013/0117621 A1 | 5/2013 | Saraiya | |
| 2013/0138468 A1* | 5/2013 | Oe | G06Q 50/06 705/7.22 |
| 2013/0148291 A1 | 6/2013 | Slessman | |
| 2013/0166455 A1 | 6/2013 | Feigelson | |
| 2013/0187464 A1 | 7/2013 | Smith | |
| 2013/0190936 A1 | 7/2013 | Belady | |
| 2013/0199629 A1 | 8/2013 | Hemsley | |
| 2013/0213038 A1 | 8/2013 | Lazaris | |
| 2013/0227139 A1 | 8/2013 | Suffling | |
| 2013/0245947 A1 | 9/2013 | Samsom | |
| 2013/0252536 A1 | 9/2013 | Chang | |
| 2013/0304903 A1 | 11/2013 | Mick | |
| 2013/0306276 A1 | 11/2013 | Duchesneau | |

(56) References Cited

U.S. PATENT DOCUMENTS

| | | |
|---|---|---|
| 2013/0328395 A1 | 12/2013 | Krizman |
| 2013/0333405 A1 | 12/2013 | Belady |
| 2013/0340994 A1 | 12/2013 | David |
| 2013/0344794 A1 | 12/2013 | Shaw |
| 2014/0016256 A1 | 1/2014 | Lin |
| 2014/0036442 A1 | 2/2014 | Giannoglou |
| 2014/0049898 A1 | 2/2014 | Wu |
| 2014/0070756 A1 | 3/2014 | Kearns |
| 2014/0096837 A1* | 4/2014 | Belady ............... F16L 55/0333 138/26 |
| 2014/0101462 A1 | 4/2014 | Rose |
| 2014/0114829 A1 | 4/2014 | Forbes |
| 2014/0137468 A1 | 5/2014 | Ching |
| 2014/0149761 A1 | 5/2014 | Allen-Ware |
| 2014/0150336 A1 | 6/2014 | Houweling |
| 2014/0167504 A1 | 6/2014 | Harris |
| 2014/0180886 A1 | 6/2014 | Forbes |
| 2014/0185225 A1 | 7/2014 | Wineland |
| 2014/0202678 A1 | 7/2014 | Goth |
| 2014/0222225 A1 | 8/2014 | Rouse |
| 2014/0230401 A1 | 8/2014 | Dunn |
| 2014/0237611 A1 | 8/2014 | Dent |
| 2014/0237614 A1 | 8/2014 | Irvine |
| 2014/0316984 A1 | 10/2014 | Schwartz |
| 2014/0324237 A1* | 10/2014 | Oe ........................ G06Q 40/00 700/287 |
| 2014/0331582 A1 | 11/2014 | Klaba |
| 2014/0332088 A1 | 11/2014 | Senesh |
| 2014/0365402 A1 | 12/2014 | Belady |
| 2014/0365795 A1 | 12/2014 | Nielsen |
| 2014/0366577 A1 | 12/2014 | Zubrin |
| 2014/0372772 A1 | 12/2014 | McKnight |
| 2014/0379156 A1 | 12/2014 | Kamel |
| 2015/0006940 A1 | 1/2015 | Kim |
| 2015/0012113 A1 | 1/2015 | Celebi |
| 2015/0012622 A1* | 1/2015 | Omatsu ................ G06Q 10/10 709/220 |
| 2015/0058845 A1 | 2/2015 | Song |
| 2015/0106811 A1 | 4/2015 | Holler |
| 2015/0121113 A1 | 4/2015 | Ramamurthy |
| 2015/0155712 A1 | 6/2015 | Mondal |
| 2015/0167550 A1 | 6/2015 | Vandervort |
| 2015/0212122 A1 | 7/2015 | Sobotka |
| 2015/0229227 A1 | 8/2015 | Aeloiza |
| 2015/0261269 A1 | 9/2015 | Bruscoe |
| 2015/0262139 A1 | 9/2015 | Shtylman |
| 2015/0276253 A1 | 10/2015 | Montalvo |
| 2015/0277410 A1 | 10/2015 | Gupta |
| 2015/0278968 A1 | 10/2015 | Steven |
| 2015/0278969 A1 | 10/2015 | Benoy |
| 2015/0280492 A1 | 10/2015 | Narita |
| 2015/0288183 A1 | 10/2015 | Villanueva |
| 2015/0292303 A1 | 10/2015 | Dusseault |
| 2015/0294308 A1 | 10/2015 | Pauker |
| 2015/0310424 A1 | 10/2015 | Myers |
| 2015/0310476 A1 | 10/2015 | Gadwa |
| 2015/0316903 A1* | 11/2015 | Asmus ................. G06Q 10/06 700/291 |
| 2015/0321739 A1* | 11/2015 | Dehlsen ................ B63G 8/001 165/45 |
| 2015/0327406 A1 | 11/2015 | Gallefoss |
| 2015/0337218 A1* | 11/2015 | Ricotta ................. C10G 53/02 208/187 |
| 2015/0356524 A1 | 12/2015 | Pennanen |
| 2015/0358943 A1 | 12/2015 | Zawodniok |
| 2015/0363132 A1 | 12/2015 | Uehara |
| 2015/0368566 A1 | 12/2015 | Young |
| 2015/0369013 A1 | 12/2015 | Weatherhead |
| 2015/0372538 A1 | 12/2015 | Siegler |
| 2016/0006066 A1 | 1/2016 | Robertson |
| 2016/0010445 A1 | 1/2016 | Harrison |
| 2016/0011617 A1 | 1/2016 | Liu |
| 2016/0013652 A1 | 1/2016 | Li |
| 2016/0021793 A1 | 1/2016 | Chen |
| 2016/0043552 A1 | 2/2016 | Villanueva |
| 2016/0052814 A1 | 2/2016 | Leyendecker |
| 2016/0054774 A1 | 2/2016 | Song |
| 2016/0087909 A1 | 3/2016 | Chatterjee |
| 2016/0091948 A1 | 3/2016 | Mitchell |
| 2016/0109122 A1 | 4/2016 | Malm |
| 2016/0109916 A1 | 4/2016 | Li |
| 2016/0112200 A1 | 4/2016 | Kheterpal |
| 2016/0113157 A1 | 4/2016 | Bao |
| 2016/0125040 A1 | 5/2016 | Kheterpal |
| 2016/0126783 A1 | 5/2016 | Cheng |
| 2016/0128238 A1 | 5/2016 | Shedd |
| 2016/0149484 A1 | 5/2016 | Wu |
| 2016/0164672 A1 | 6/2016 | Karighattam |
| 2016/0170469 A1 | 6/2016 | Sehgal |
| 2016/0172900 A1 | 6/2016 | Welch |
| 2016/0187906 A1 | 6/2016 | Bodas |
| 2016/0198656 A1 | 7/2016 | McNamara |
| 2016/0202744 A1 | 7/2016 | Castro-Leon |
| 2016/0212954 A1 | 7/2016 | Argento |
| 2016/0214715 A1 | 7/2016 | Meffert |
| 2016/0218879 A1 | 7/2016 | Ferrin |
| 2016/0248631 A1 | 8/2016 | Duchesneau |
| 2016/0249484 A1 | 8/2016 | Parizeau |
| 2016/0261226 A1 | 9/2016 | Hamilton |
| 2016/0261404 A1 | 9/2016 | Ford |
| 2016/0261685 A1* | 9/2016 | Chen ..................... H04W 12/35 |
| 2016/0283920 A1 | 9/2016 | Fisher |
| 2016/0300234 A1 | 10/2016 | Moss-Pultz |
| 2016/0319653 A1 | 11/2016 | Reeves |
| 2016/0324077 A1 | 11/2016 | Frantzen |
| 2016/0328713 A1 | 11/2016 | Ebrahimi |
| 2016/0330031 A1* | 11/2016 | Drego ................... H04L 9/3239 |
| 2016/0330035 A1 | 11/2016 | Ebrahimi |
| 2016/0342977 A1 | 11/2016 | Lam |
| 2016/0362954 A1 | 12/2016 | Hansen |
| 2016/0377306 A1 | 12/2016 | Drees |
| 2017/0013746 A1 | 1/2017 | Campbell |
| 2017/0018467 A1 | 1/2017 | Walker |
| 2017/0023969 A1 | 1/2017 | Shows |
| 2017/0027086 A1 | 1/2017 | Noteboom |
| 2017/0104332 A1 | 4/2017 | Wenzel |
| 2017/0104336 A1 | 4/2017 | ElBsat |
| 2017/0104337 A1 | 4/2017 | Drees |
| 2017/0104342 A1 | 4/2017 | ElBsat |
| 2017/0104343 A1 | 4/2017 | ElBsat |
| 2017/0112023 A1 | 4/2017 | Mao |
| 2017/0169344 A1* | 6/2017 | Mangharam ........... G06N 5/025 |
| 2017/0185132 A1 | 6/2017 | Bodas |
| 2017/0192483 A1 | 7/2017 | Boss |
| 2017/0194791 A1 | 7/2017 | Budde |
| 2017/0201098 A1 | 7/2017 | Carpenter |
| 2017/0207629 A1* | 7/2017 | Seki ....................... G05B 15/02 |
| 2017/0209822 A1 | 7/2017 | Lopez |
| 2017/0214070 A1 | 7/2017 | Wang |
| 2017/0218843 A1 | 8/2017 | Oehring |
| 2017/0237261 A1 | 8/2017 | Maug |
| 2017/0243290 A1* | 8/2017 | Brown ................ G06Q 30/0202 |
| 2017/0249606 A1* | 8/2017 | Pirooz ................... G06Q 40/02 |
| 2017/0261949 A1 | 9/2017 | Hoffmann |
| 2017/0265326 A1 | 9/2017 | Totani |
| 2017/0271701 A1 | 9/2017 | Berlowitz |
| 2017/0280594 A1 | 9/2017 | Sato |
| 2017/0300359 A1 | 10/2017 | Kollur |
| 2017/0302077 A1* | 10/2017 | Yabe ....................... H02J 3/005 |
| 2017/0302171 A1* | 10/2017 | Goto ..................... G05B 15/02 |
| 2017/0311487 A1 | 10/2017 | Rau |
| 2017/0329908 A1* | 11/2017 | Braswell ................ G16H 40/20 |
| 2017/0349058 A1* | 12/2017 | Bernier ................... H02J 3/14 |
| 2017/0352010 A1* | 12/2017 | Son ....................... G06Q 10/20 |
| 2017/0358041 A1* | 12/2017 | Forbes, Jr. ............. H02J 3/008 |
| 2017/0366412 A1 | 12/2017 | Piga |
| 2017/0373500 A1 | 12/2017 | Shafi |
| 2018/0026478 A1 | 1/2018 | Peloso |
| 2018/0042064 A1* | 2/2018 | Norton ................... H05B 47/20 |
| 2018/0052431 A1 | 2/2018 | Shaikh |
| 2018/0101220 A1 | 4/2018 | Mahindru |
| 2018/0109112 A1 | 4/2018 | Paine |
| 2018/0109162 A1 | 4/2018 | Paine |

(56) References Cited

U.S. PATENT DOCUMENTS

| | | |
|---|---|---|
| 2018/0109163 A1 | 4/2018 | Paine |
| 2018/0109541 A1* | 4/2018 | Gleichauf ............. H04W 12/06 |
| 2018/0116070 A1 | 4/2018 | Broadbent |
| 2018/0124955 A1 | 5/2018 | Rogers |
| 2018/0144414 A1 | 5/2018 | Lee |
| 2018/0152023 A1* | 5/2018 | Guruprasad ............. H02J 3/38 |
| 2018/0175666 A1 | 6/2018 | Ayer |
| 2018/0181153 A1* | 6/2018 | Takahashi ................. G05F 1/66 |
| 2018/0192538 A1 | 7/2018 | Sakalkar |
| 2018/0202825 A1 | 7/2018 | You |
| 2018/0240112 A1 | 8/2018 | Castinado |
| 2018/0267839 A1 | 9/2018 | Maisuria |
| 2018/0284707 A1* | 10/2018 | Menon ...................... F02C 9/28 |
| 2018/0294649 A1 | 10/2018 | Bright |
| 2018/0351367 A1* | 12/2018 | Kogo ................... G05B 19/042 |
| 2018/0366978 A1 | 12/2018 | Matan |
| 2018/0367320 A1 | 12/2018 | Montalvo |
| 2019/0018394 A1* | 1/2019 | Sayyarrodsari .... G06Q 10/0833 |
| 2019/0022580 A1 | 1/2019 | Al Muhsen |
| 2019/0042990 A1* | 2/2019 | Paul ................... G06Q 10/0637 |
| 2019/0044412 A1 | 2/2019 | Halbert |
| 2019/0052094 A1 | 2/2019 | Pmsvvsv |
| 2019/0063252 A1* | 2/2019 | Spears ................. H05K 7/1498 |
| 2019/0082618 A1 | 3/2019 | Lopez |
| 2019/0122132 A1* | 4/2019 | Rimini ................... G06N 7/005 |
| 2019/0148819 A1 | 5/2019 | Dominguez |
| 2019/0168630 A1 | 6/2019 | Mrlik |
| 2019/0173283 A1 | 6/2019 | Epel |
| 2019/0258307 A1 | 8/2019 | Shaikh |
| 2019/0261589 A1 | 8/2019 | Pham |
| 2019/0267644 A1* | 8/2019 | Berntsen ................. B60L 50/72 |
| 2019/0280521 A1 | 9/2019 | Lundstrom |
| 2019/0306176 A1* | 10/2019 | Gleichauf ............. H04W 12/10 |
| 2019/0318327 A1 | 10/2019 | Sowell |
| 2019/0324820 A1 | 10/2019 | Krishnan |
| 2019/0332149 A1 | 10/2019 | Shelnutt |
| 2019/0335625 A1 | 10/2019 | Shelnutt |
| 2019/0335626 A1 | 10/2019 | Shelnutt |
| 2019/0339756 A1 | 11/2019 | Lewis |
| 2019/0354076 A1 | 11/2019 | Henson |
| 2019/0357390 A1 | 11/2019 | Preuss |
| 2020/0006938 A1 | 1/2020 | Torvund |
| 2020/0008320 A1 | 1/2020 | Yu |
| 2020/0033837 A1 | 1/2020 | Simmons |
| 2020/0040272 A1 | 2/2020 | Cavness |
| 2020/0051184 A1 | 2/2020 | Barbour |
| 2020/0073466 A1* | 3/2020 | Walsh ................... G06Q 20/127 |
| 2020/0089307 A1 | 3/2020 | McNamara |
| 2020/0091717 A1 | 3/2020 | McNamara |
| 2020/0091727 A1 | 3/2020 | McNamara |
| 2020/0091766 A1 | 3/2020 | McNamara |
| 2020/0103958 A1 | 4/2020 | Chen |
| 2020/0107475 A1 | 4/2020 | Keisling |
| 2020/0136387 A1 | 4/2020 | McNamara |
| 2020/0136388 A1 | 4/2020 | McNamara |
| 2020/0154596 A1 | 5/2020 | Roy |
| 2020/0161865 A1* | 5/2020 | Clifton ................. H02J 7/0068 |
| 2020/0167197 A1 | 5/2020 | Bahramshahry |
| 2020/0177100 A1 | 6/2020 | Wang |
| 2020/0318843 A1 | 10/2020 | Wenzel |
| 2020/0319700 A1 | 10/2020 | Wu |
| 2020/0321776 A1 | 10/2020 | Shaver |
| 2020/0341439 A1* | 10/2020 | Valin ....................... H02S 40/44 |
| 2020/0359572 A1 | 11/2020 | Henson |
| 2020/0379537 A1 | 12/2020 | Henson |
| 2020/0395761 A1* | 12/2020 | Walsh ..................... H02J 3/381 |
| 2021/0014997 A1 | 1/2021 | Johnson |
| 2021/0021135 A1 | 1/2021 | ElBsat |
| 2021/0035242 A1 | 2/2021 | McNamara |
| 2021/0036547 A1 | 2/2021 | McNamara |
| 2021/0057913 A1 | 2/2021 | Cavness |
| 2021/0092875 A1 | 3/2021 | Hellmann-Regen |
| 2021/0101499 A1 | 4/2021 | McNamara |
| 2021/0111585 A1 | 4/2021 | McNamara |
| 2021/0124322 A1 | 4/2021 | McNamara |
| 2021/0126456 A1 | 4/2021 | McNamara |
| 2021/0175710 A1 | 6/2021 | Campbell |
| 2021/0287309 A1 | 9/2021 | Gebhardt |
| 2021/0288495 A1 | 9/2021 | McNamara |
| 2021/0288496 A1 | 9/2021 | McNamara |
| 2021/0294267 A1 | 9/2021 | Constancias |
| 2021/0294287 A1* | 9/2021 | Valin .................... G06Q 20/308 |
| 2021/0294405 A1 | 9/2021 | McNamara |
| 2021/0296893 A1 | 9/2021 | McNamara |
| 2021/0296928 A1 | 9/2021 | McNamara |
| 2021/0298195 A1 | 9/2021 | Barbour |
| 2021/0312574 A1 | 10/2021 | McNamara |
| 2021/0325955 A1 | 10/2021 | McNamara |
| 2021/0345526 A1 | 11/2021 | Thornton |
| 2021/0378131 A1 | 12/2021 | Johnson |
| 2022/0033517 A1 | 2/2022 | Hendry |
| 2022/0039333 A1 | 2/2022 | Avila |
| 2022/0085603 A1 | 3/2022 | McNamara |
| 2022/0197363 A1 | 6/2022 | McNamara |
| 2022/0294219 A1 | 9/2022 | McNamara |
| 2022/0352720 A1 | 11/2022 | Cavness |
| 2022/0366517 A1 | 11/2022 | McNamara |
| 2022/0407350 A1 | 12/2022 | McNamara |
| 2023/0121669 A1 | 4/2023 | McNamara |

FOREIGN PATENT DOCUMENTS

| | | |
|---|---|---|
| AU | 2016100178 A4 * | 3/2016 |
| AU | 2016100394 A4 * | 5/2016 |
| CA | 2332840 A1 | 11/1999 |
| CA | 2522428 A1 | 4/2007 |
| CA | 2653778 A1 | 12/2007 |
| CA | 101501596 A | 8/2009 |
| CA | 2793537 A1 | 10/2011 |
| CA | 2758681 A1 | 5/2012 |
| CA | 2758725 A1 | 5/2012 |
| CA | 2752594 A1 | 12/2012 |
| CA | 2914797 A1 | 11/2014 |
| CA | 3090944 A1 | 8/2018 |
| CA | 3105380 A1 | 2/2020 |
| CA | 3111583 A1 | 3/2020 |
| CA | 3111830 A1 | 3/2020 |
| CA | 3112037 A1 | 3/2020 |
| CA | 3118128 A1 | 5/2020 |
| CA | 3126390 A1 | 7/2020 |
| CA | 3048706 A1 | 8/2020 |
| CA | 3128478 A1 | 9/2020 |
| CA | 3139776 A1 | 11/2020 |
| CA | 3050389 A1 | 1/2021 |
| CA | 3076653 A1 | 9/2021 |
| CN | 1656661 A | 8/2005 |
| CN | 1847626 A | 10/2006 |
| CN | 101803148 A | 8/2010 |
| CN | 102185382 A | 9/2011 |
| CN | 102541219 A | 7/2012 |
| CN | 102591921 A | 7/2012 |
| CN | 102762409 A | 10/2012 |
| CN | 202503827 U | 10/2012 |
| CN | 103163904 A | 6/2013 |
| CN | 103327785 A | 9/2013 |
| CN | 103440028 A | 12/2013 |
| CN | 103443550 A | 12/2013 |
| CN | 103562817 A | 2/2014 |
| CN | 103748757 A | 4/2014 |
| CN | 104144183 A | 11/2014 |
| CN | 204244139 U * | 4/2015 |
| CN | 104715340 A | 6/2015 |
| CN | 104969434 A | 10/2015 |
| CN | 105451504 A | 3/2016 |
| CN | 105814543 A | 7/2016 |
| CN | 106226718 A | 12/2016 |
| CN | 106659054 A | 5/2017 |
| CN | 107257608 A | 10/2017 |
| CN | 107967536 A | 4/2018 |
| CN | 110083212 A | 8/2019 |
| CN | 111522652 A | 8/2020 |
| CN | 112106051 A | 12/2020 |
| CN | 112438006 A | 3/2021 |
| DE | 738523 C | 8/1943 |

(56) References Cited

FOREIGN PATENT DOCUMENTS

| | | |
|---|---|---|
| EP | 1167861 A1 | 1/2002 |
| EP | 1490941 A1 | 12/2004 |
| EP | 1993774 A2 | 11/2008 |
| EP | 2036189 A2 | 3/2009 |
| EP | 2074337 A2 | 7/2009 |
| EP | 2354378 A1 | 8/2011 |
| EP | 2446516 A2 | 5/2012 |
| EP | 2634956 A2 | 9/2013 |
| EP | 2648496 A2 | 10/2013 |
| EP | 2721710 | 4/2014 |
| EP | 2900045 A1 | 7/2015 |
| EP | 3035480 A1 | 6/2016 |
| EP | 3054405 A1 | 8/2016 |
| EP | 3266087 A1 | 1/2018 |
| EP | 3465865 A1 | 4/2019 |
| EP | 3807972 A1 | 4/2021 |
| EP | 3850462 A1 | 7/2021 |
| ES | 2765100 T3 | 6/2020 |
| FR | 2954670 A1 | 6/2011 |
| FR | 2954671 A1 | 6/2011 |
| FR | 2957163 A1 | 9/2011 |
| FR | 2960662 A1 | 12/2011 |
| FR | 2999819 A1 | 6/2014 |
| FR | 3017024 A1 | 7/2015 |
| GB | 2560378 A | 9/2018 |
| JP | 2005056196 A | 3/2005 |
| JP | 3717420 | 11/2005 |
| JP | 2005353497 A | 12/2005 |
| JP | 2011123873 A | 6/2011 |
| JP | 2012032107 A | 2/2012 |
| JP | 2013524317 A | 6/2013 |
| JP | 2014518060 A | 7/2014 |
| JP | 5662877 B2 | 2/2015 |
| JP | 2015528266 A | 9/2015 |
| JP | 2017530449 A | 10/2017 |
| KR | 20090012523 A | 2/2009 |
| KR | 100907946 B1 | 7/2009 |
| KR | 101399235 B1 | 5/2014 |
| KR | 20180084285 A | 7/2018 |
| NL | 2004277 C2 | 8/2011 |
| RU | 2012138911 A | 5/2014 |
| RU | 2642422 C2 | 1/2018 |
| TW | 201214093 A | 4/2012 |
| TW | 201526774 A | 7/2015 |
| WO | 99/60687 A1 | 11/1999 |
| WO | 02/07365 A2 | 1/2002 |
| WO | 2006/058341 A2 | 6/2006 |
| WO | 2008/039773 A2 | 4/2008 |
| WO | 2009/113824 A2 | 9/2009 |
| WO | 2010/050249 A1 | 5/2010 |
| WO | 2011/130406 A1 | 10/2011 |
| WO | 2012/014093 A1 | 2/2012 |
| WO | 2012/177769 A1 | 12/2012 |
| WO | 2013/022501 A1 | 2/2013 |
| WO | 2013/066602 A1 | 5/2013 |
| WO | 2013/066604 A1 | 5/2013 |
| WO | 2014/005156 A2 | 1/2014 |
| WO | 2014/130972 A1 | 8/2014 |
| WO | 2014/185311 A1 | 11/2014 |
| WO | 2015/039122 A1 | 3/2015 |
| WO | 2015/072989 A1 | 5/2015 |
| WO | WO-2015077378 A1 * | 5/2015 ......... G06Q 20/0655 |
| WO | 2015/123257 A1 | 8/2015 |
| WO | 2015/175693 A1 | 11/2015 |
| WO | 2015199629 A1 | 12/2015 |
| WO | 2016/064342 A1 | 4/2016 |
| WO | 2016/067295 A1 | 5/2016 |
| WO | 2016/106373 A1 | 6/2016 |
| WO | 2016/145052 A1 | 9/2016 |
| WO | 2017/074513 A1 | 5/2017 |
| WO | 2017/163126 A1 | 9/2017 |
| WO | 2017/214210 A1 | 12/2017 |
| WO | 2018/068042 A1 | 4/2018 |
| WO | 2018/145201 A1 | 8/2018 |
| WO | 2019/060180 A2 | 3/2019 |
| WO | 2019/113136 A1 | 6/2019 |
| WO | 2019/116375 A1 | 6/2019 |
| WO | 2019/139632 A1 | 7/2019 |
| WO | 2019/139633 A1 | 7/2019 |
| WO | 2020/007435 A1 | 1/2020 |
| WO | 2020/056322 A1 | 3/2020 |
| WO | 2020/163939 A1 | 8/2020 |
| WO | 2020/163968 A2 | 8/2020 |
| WO | 2020/176486 A1 | 9/2020 |
| WO | 2020/227811 A1 | 11/2020 |
| WO | 2021/022174 A1 | 2/2021 |
| WO | 2021/022175 A1 | 2/2021 |
| WO | 2021/086930 A1 | 5/2021 |
| WO | 2021/129692 A1 | 7/2021 |
| WO | 2021/173973 A1 | 9/2021 |
| WO | 2022/031836 A1 | 2/2022 |

OTHER PUBLICATIONS

WayBack Machine. "New Century Exploration." (2022). Retrieved online Apr. 16, 2022. https://web.archive.org/web/20220401000000*/https://www.newcenturyexp.com/ (Year: 2022).*

Youtube. "Why is natural gas flared? What is the solution?" (Jul. 23, 2015). Retrieved online Apr. 17, 2022. https://www.youtube.com/watch?v=4_vEUnIOAs8 (Year: 2015).*

Albert Szmigielski, Bitcoin Essentials, published Feb. 2016, 130 pages.

Alex Lielacher, Crypto you can mine from a home computer in 2023, Jul. 18, 2023, obtained Jul. 20, 2023, 11 pages.

Amanda Stephenson, Genalta Power earns carbon offsets for turning flare gas into electricity, Calgary Herald, posted Sep. 30, 2014, 6 pages.

An Innovative Solution to Flaring, Crusoe Energy, available as early as December, 9, 2019, 2 pgs, screenshots taken from Wayback Machine internet archive, URL=https://web.archive.org/web/20191209224205/https://www.crusoeenergy.com/.

Aprice44, Mining with Free Natural Gas, Reddit posting, allegedly available as early as Jul. 3, 2016, 1 page.

Bitcoin Container, 10ft Bitcoin Mining Container, accessed Sep. 5, 2019 available at least as early as May 14, 2019, 5 pages, URL= https://bitcoincontainer.com/products/10ft-bitcoin-mining-container.

Bitfury, Block Box AC Mobile Datacenter, available at least as early as Feb. 8, 2017, 3 pages, screenshots taken from Wayback machine Internet archive, URL=https://web.archive.org/web/20170130043612/http:/bitfury.com/products#blockbox-ac.

Bitfury, BlockBox AC, available at least as early as May 9, 2019, 7 pages, URL=https://bitfury.com/content/downloads/blockboxacbrochure176v2.

Bitmain, Antminer T9+, accessed Apr. 24, 2019 but available as early as Feb. 3, 2018, 3 pages, Screenshots taken from Wayback machine Internet archive, URL=https://web.archive.org/web/20180217221522/http://shop.bitmain.com/productDetail.htm?pid=000201801301302128506gKlcpoR06AA.

Complaint for Patent Infringement, *Upstream Data Inc. v. Crusoe Energy Systems LLC*, Case No. 1:23-cv-01252, D. Colo. May 18, 2023, 13 pages.

Crusoe Energy Systems, LLC, Petition for Post-Grant Review of U.S. Pat. No. 11,574,372 Pursuant to 37 C.F.R. §42.200 et seq., filed Jul. 20, 2023, 138 pages.

Cryptocurrency investors eye provinces with low electricity rates, The Fraser Institute Blog, posted Jan. 31, 2018, 3 pages.

CryptoKube, CryptoKube Brochure, obtained Jul. 17, 2023 from the WaybackMachine dated Mar. 5, 2016, 5 pages.

CryptoKube, Screenshots and transcript from CryptoKube, available as early as 2014.

EZ Blockchain, EZ Smartbox, available at least as early as May 9, 2019, 5 pages, URL=https://www.ezblockchain.net/smart-box.html.

Gerald Sanders and Johnson Space Center, Gas Conversion Systems Reclaim Fuel for Industry, published in 2015, 4 pages.

International Search report and written opinion for PCT/CA2020/050426, dated Jun. 25, 2020, 14 pages.

(56) References Cited

OTHER PUBLICATIONS

International Search Report and written opinion issued on PCT application No. PCT/CA2018/050135, 9 pages.
Iwando Blockchain, Crypto Mining Container, available at least as early as May 9, 2019, 9 pages, URL=https://blockchain.iwando.com/en/crypto-mining-container/.
Jchi2210, Free natural gas, is it worth it to use a Natural gas generator?, Bitcoin Forum, posted Aug. 27, 2017, 7 pages.
June Ann Munford, Declaration of June Ann Munford, Jul. 19, 2023, 225 pages.
Kenyn, Saving the environment through bitcoin; one transaction equals 117 recycled bottles, Reddit, posted Feb. 26, 2017, 17 pages.
Kinolva, Shower Thought: Mining Bitcoin for Heat / Hot Water?, Reddit, posted Jan. 28, 2017, 14 pages.
Machine generated transcript, Using Natural Gas To Mine Bitcoin With Matthew Lohstroh, Sep. 18, 2018, retrieved online Aug. 18, 2023, https://www.youtube.com/watch?v=TYpsZzlevow, 17 pages.
Mia Bennett, Blog—Bitcoin mining: The next rush to hit the Arctic?, posted Feb. 6, 2018, 14 pages.
Michael Nikolaou, Declaration of Michael Nikolaou, Jul. 20, 2023, 157 pages.
Miningstore, BitCave, accessed May 9, 2019 but available at least as early as Mar. 27, 2019, 4 pages, URL=https://miningstore.com/bitcoin-mining-containers/bitcave/.
Youtube, Horizontal Container Twist Lock/Connector, Aug. 10, 2020, MYTEE Products, retrieved online Nov. 22, 2022, https://www.youtube.com/watch?v=c1unwiisykc.
Nordcoin Mining, Mobile Mining Container, accessed May 9, 2019 but available as early as Feb. 6, 2019, 7 pages, URL=https://www.nordcoinmining.com/.
Office Action issued on Canadian patent application 3090944, Jan. 28, 2022, 3 pages.
Polivka GmbH, Mining Container ~100KW by Polivka GmbH, obtained Jun. 29, 2023 from the WaybackMachine dated May 20, 2015, 36 pages.
Polivka GmbH, Screenshots of Mining Container Setup on Vimeo, available as early as Feb. 9, 2015.
Power Mining, Mobile Mining Unit ASIC-184, accessed May 9, 2019 but available as early as Dec. 27, 2018, 8 pages, URL=https://www.powerminingshop.com/pdf/Power_Mining_Crpyo_Container_ASIC_184.
Pymnts, China Moves to Squeeze Out Bitcoin Mining, posted Jan. 10, 2018, 7 pages.
Sea-Can Containers Ltd, Shipping Containers, accessed Jan. 17, 2020 but available as early as Jul. 3, 2018, 3 pages, Screenshots taken from Wayback machine Internet archive, URL=https://web.archive.org/web/20180703184711/http://seacan.com/shipping-containers/.
Solminer, SOLminer Cube, accessed May 9, 2019 but available at least as early as Sep. 16, 2018, 7 pages, URL=https://solminer.io/mobile-mining-system/.
The Best Places in The World to Mine Bitcoin, PRNewswire, posted Jan. 18, 2018, 8 pages.
Theselfgoverned, Electricity Consumption: Bitcoin mining vs The current global financial system, Reddit, posted Jun. 5, 2014, 15 pages.
Vernon Kasdorf, Declaration of Vernon Kasdorf, Jul. 20, 2023, 116 pages.
WayBack Machine, New Century Exploration (2022) Retrieved online Apr. 16, 2022, https://web.archive.org/web/20220401000000*/https://www.newcenturyexp.com/.
WayBack Machine, New Century Exploration—What We Do (2022) Retrieved online Apr. 16, 2022, https://web.archive.org/web/20220330234542/https://www.newcenturyexp.com/.
Wiki, Google Modular Data Center, accessed Oct. 5, 2019 but available at least as early as Feb. 8, 2017, 2 pages, URL=https://en.wikipedia.org/wiki/Google_Modular_Data_Center.
Wiki, Intermodal Container, accessed Oct. 5, 2019 but available at least as early as Feb. 8, 2017, 20 pages, URL=https://en.wikipedia.org/wiki/Intermodal_container 6/.
Wiki, Mining, accessed Jan. 19, 2017, 4 pages, URL=https://en.bitcoin.it/wiki/Mining.
Wiki, Sun Modular Datacenter, accessed Oct. 5, 2019 but available at least as early as Feb. 8, 2017, 2 pages, URL=https://en.wikipedia.org/wiki/Sun_Modular_Datacenter.
Youtube, Why is natural gas flared? What is the solution?, Jun. 23, 2015, Retrieved online May 10, 2022, https://www.youtube.com/watch?v=4_vEUnlOAs8.
Machine generated translation of Foreign Patent submission #25 (CN101501596), retrieved online Aug. 23, 2023, 20 pages.
Machine generated translation of Foreign Patent submission #26 (CN101803148), retrieved online Aug. 23, 2023, 29 pages.
Machine generated translation of Foreign Patent submission #27 (CN102185382), retrieved online Aug. 23, 2023, 14 pages.
Machine generated translation of Foreign Patent submission #28 (CN102541219), retrieved online Aug. 23, 2023, 7 pages.
Machine generated translation of Foreign Patent submission #29 (CN102591921), retrieved online Aug. 23, 2023, 15 pages.
Machine generated translation of Foreign Patent submission #30 (CN102762409), retrieved online Aug. 23, 2023, 24 pages.
Machine generated translation of Foreign Patent submission #31 (CN103163904), retrieved online Aug. 23, 2023, 33 pages.
Machine generated translation of Foreign Patent submission #32 (CN103327785), retrieved online Aug. 23, 2023, 6 pages.
Machine generated translation of Foreign Patent submission #33 (CN103440028), retrieved online Aug. 23, 2023, 19 pages.
Machine generated translation of Foreign Patent submission #34 (CN103443550), retrieved online Aug. 23, 2023, 11 pages.
Machine generated translation of Foreign Patent submission #35 (CN103562817), retrieved online Aug. 23, 2023, 15 pages.
Machine generated translation of Foreign Patent submission #36 (CN103748757), retrieved online Aug. 23, 2023, 26 pages.
Machine generated translation of Foreign Patent submission #37 (CN104144183), retrieved online Aug. 23, 2023, 52 pages.
Machine generated translation of Foreign Patent submission #38 (CN104715340), retrieved online Aug. 23, 2023, 8 pages.
Machine generated translation of Foreign Patent submission #39 (CN104969434), retrieved online Aug. 23, 2023, 27 pages.
Machine generated translation of Foreign Patent submission #40 (CN105451504), retrieved online Aug. 23, 2023, 16 pages.
Machine generated translation of Foreign Patent submission #41 (CN105814543), retrieved online Aug. 23, 2023, 19 pages.
Machine generated translation of Foreign Patent submission #42 (CN106226718), retrieved online Aug. 23, 2023, 13 pages.
Machine generated translation of Foreign Patent submission #43 (CN106659054), retrieved online Aug. 23, 2023, 4 pages.
Machine generated translation of Foreign Patent submission #44 (CN107257608), retrieved online Aug. 23, 2023, 11 pages.
Machine generated translation of Foreign Patent submission #45 (CN107967536), retrieved online Aug. 23, 2023, 20 pages.
Machine generated translation of Foreign Patent submission #46 (CN110083212), retrieved online Aug. 23, 2023, 19 pages.
Machine generated translation of Foreign Patent submission #47 (CN111522652), retrieved online Aug. 23, 2023, 16 pages.
Machine generated translation of Foreign Patent submission #48 (CN112106051), retrieved online Aug. 23, 2023, 22 pages.
Machine generated translation of Foreign Patent submission #49 (CN112438006), retrieved online Aug. 23, 2023, 34 pages.
Machine generated translation of Foreign Patent submission #50 (CN1656661), retrieved online Aug. 23, 2023, 56 pages.
Machine generated translation of Foreign Patent submission #51 (CN1847626), retrieved online Aug. 23, 2023, 11 pages.
Machine generated translation of Foreign Patent submission #52 (CN202503827), retrieved online Aug. 23, 2023, 7 pages.
Machine generated translation of Foreign Patent submission #53 (DE738523), retrieved online Aug. 23, 2023, 5 pages.
Machine generated translation of Foreign Patent submission #64 (EP2900045), retrieved online Aug. 23, 2023, 10 pages.
Machine generated translation of Foreign Patent submission #71 (ES2765100), retrieved online Aug. 23, 2023, 15 pages.
Machine generated translation of Foreign Patent submission #72 (FR2954670), retrieved online Aug. 23, 2023, pages.

(56) References Cited

OTHER PUBLICATIONS

Machine generated translation of Foreign Patent submission #73 (FR2954671), retrieved online Aug. 23, 2023, pages.
Machine generated translation of Foreign Patent submission #74 (FR2957163), retrieved online Aug. 23, 2023, 8 pages.
Machine generated translation of Foreign Patent submission #75 (FR2960662), retrieved online Aug. 23, 2023, 10 pages.
Machine generated translation of Foreign Patent submission #76 (FR2999819), retrieved online Aug. 23, 2023, 10 pages.
Machine generated translation of Foreign Patent submission #77 (FR3017024), retrieved online Aug. 23, 2023, 8 pages.
Machine generated translation of Foreign Patent submission #79 (JP2005056196), retrieved online Aug. 23, 2023, 10 pages.
Machine generated translation of Foreign Patent submission #80 (JP2005353497), retrieved online Aug. 23, 2023, 14 pages.
Machine generated translation of Foreign Patent submission #81 (JP2011123873), retrieved online Aug. 23, 2023, 10 pages.
Machine generated translation of Foreign Patent submission #82 (JP2012032107), retrieved online Aug. 23, 2023, 7 pages.
Machine generated translation of Foreign Patent submission #83 (JP2013524317), retrieved online Aug. 23, 2023, 10 pages.
Machine generated translation of Foreign Patent submission #84 (JP2014518060), retrieved online Aug. 23, 2023, 18 pages.
Machine generated translation of Foreign Patent submission #85 (JP2015528266), retrieved online Aug. 23, 2023, 9 pages.
Machine generated translation of Foreign Patent submission #86 (JP2017530449), retrieved online Aug. 23, 2023, 23 pages.
Machine generated translation of Foreign Patent submission #87 (JP3717420), retrieved online Aug. 23, 2023, 22 pages.
Machine generated translation of Foreign Patent submission #88 (JP5662877), retrieved online Aug. 23, 2023, 13 pages.
Machine generated translation of Foreign Patent submission #89 (KR100907946), retrieved online Aug. 23, 2023, 15 pages.
Machine generated translation of Foreign Patent submission #90 (KR101399235), retrieved online Aug. 23, 2023, 19 pages.
Machine generated translation of Foreign Patent submission #91 (KR20090012523), retrieved online Aug. 23, 2023, 16 pages.
Machine generated translation of Foreign Patent submission #92 (KR20180084285), retrieved online Aug. 23, 2023, 19 pages.
Machine generated translation of Foreign Patent submission #95 (RU2642422), retrieved online Aug. 23, 2023, 27 pages.
Machine generated translation of Foreign Patent submission #97 (TW201214093), retrieved online Aug. 23, 2023, 6 pages.
Machine generated translation of Foreign Patent submission #98 (TW201526774), retrieved online Aug. 23, 2023, 6 pages.
Machine generated translation of Foreign Patent submission #103 (WO2010050249), retrieved online Aug. 23, 2023, 23 pages.
Machine generated translation of Foreign Patent submission #112 (WO2014185311), retrieved online Aug. 23, 2023, 13 pages.
Final Written Decision for Post Grant Review U.S. Pat. No. 11,574,372, PGR2023-00039, available as early as Jan. 21, 2025, 60 pages.
Deposition Transcript of Vernon Kasdorf for Post Grant Review U.S. Pat. No. 11,574,372, PGR2023-00039, available as early as Sep. 13, 2024, 52 pages.

\* cited by examiner

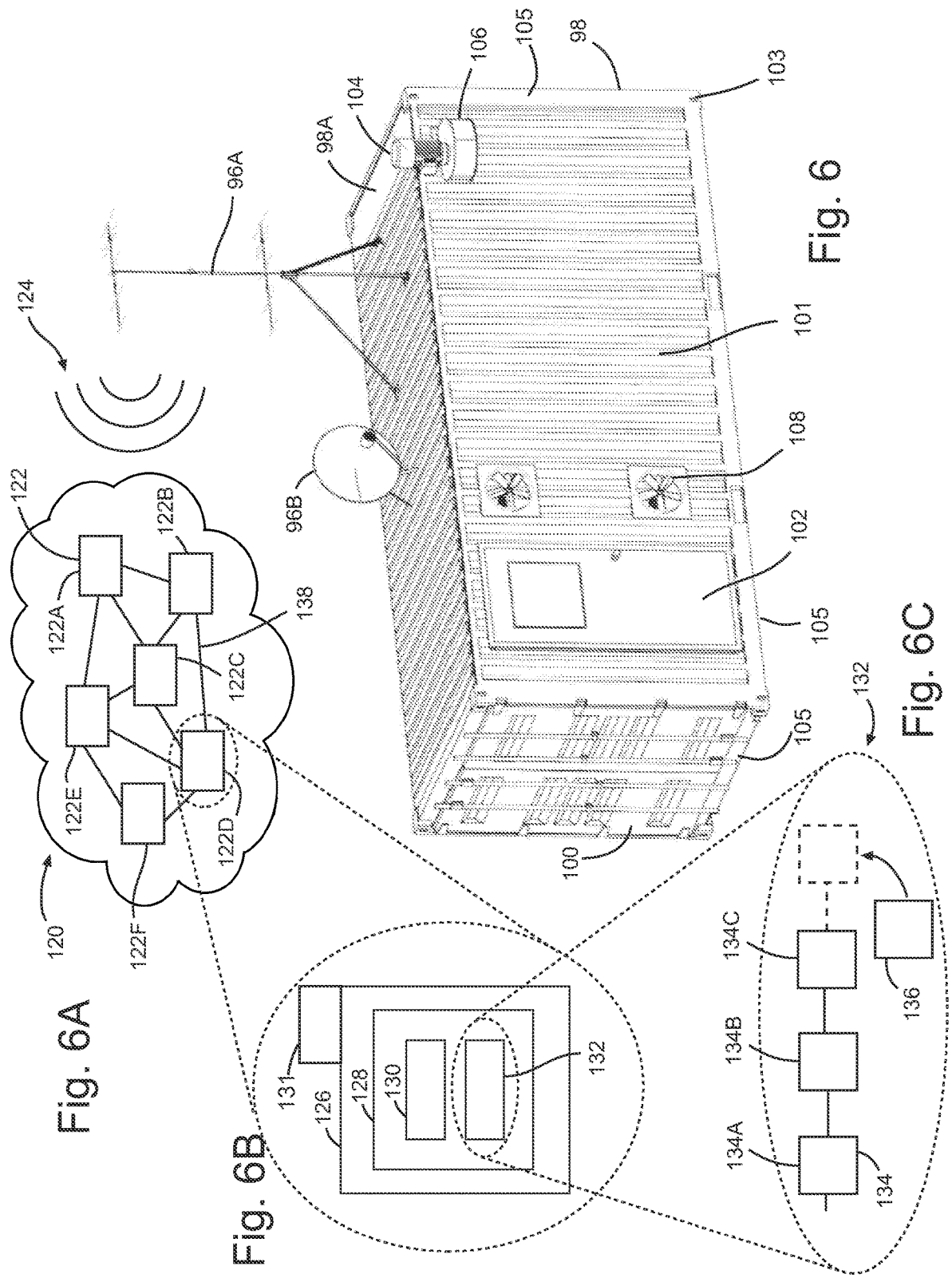

BLOCKCHAIN MINING SYSTEM WITH LOAD MODULATION

TECHNICAL FIELD

This document relates to blockchain mining at an oil or gas facility.

BACKGROUND

At remote oil and gas facilities, excess natural gas is often wasted, for example vented to atmosphere or burned via flaring.

SUMMARY

A system is disclosed comprising: a source of combustible gas produced from an oil production, storage, or processing facility, such as a remote oil well; a generator connected to the source of combustible gas; and a blockchain mining device connected to the generator.

A method is disclosed comprising using a source of combustible gas produced at a hydrocarbon production well, storage, or processing facility, to produce electricity to operate a blockchain mining device located at the hydrocarbon production well, storage, or processing facility, respectively.

A method is disclosed comprising using a source of combustible gas, which is produced from a remote oil or gas well, to produce electricity to operate a blockchain mining device.

A method is disclosed comprising: disconnecting a source of combustible gas from a gas vent or combustion device at a hydrocarbon production well or processing facility; and connecting the source of combustible gas to produce electricity to operate a blockchain mining device.

A method is disclosed comprising using a source of combustible gas, which is produced from a remote oil or gas well, to produce electricity to operate a blockchain mining device.

A method is disclosed of reducing vented or flared natural gas at upstream oil and gas facilities, the method consists of operating a natural gas aspirated prime mover fueled directly by the vented or flared gas source; the prime mover runs a generator to generate power, the generator powers a portable blockchain mine.

An upstream oil and gas blockchain mining apparatus is disclosed comprising a well, excess gas is captured off the casing of the well to run a natural gas engine, the engine runs both a hydraulic pump and a generator, the generator powers a portable blockchain mine, where the mining load is sized at the low end of the variable availability of gas; excess gas above the amount required to fuel the load is vented, where the mining load is sized at the low end of the variable availability of gas; the prime mover varies its torque based on the availability of the gas so as to minimize excess vented gas, excess power above the amount necessary to run the mining load is dissipated in a load bank, where the mining load is sized at the high end of the variable availability of gas; and make-up gas is taken from propane tanks on site or from line gas.

An upstream oil and gas blockchain mining apparatus is disclosed comprising a well, excess gas is captured off the casing of the well to run a prime mover such as an engine, turbine or boiler, the prime mover runs a generator, the generator powers a portable blockchain mine, where the mining load is sized at the low end of the variable availability of gas; excess gas above the amount required to fuel the load is vented, where the mining load is sized at the low end of the variable availability of gas; the prime mover varies its torque based on the availability of the gas so as to minimize excess vented gas, excess power above the amount necessary to run the mining load is dissipated in a load bank, where the mining load is sized at the high end of the variable availability of gas; make-up gas is taken from propane tanks on site or from line gas.

An upstream oil and gas blockchain mining apparatus is disclosed comprising a multi-well pad or group of satellite wells that produce into an oil treating facility, gas is captured off of the casing of the wells or off of oil and gas separating vessels such as tanks at the treating facility via vapor recovery units or compressors, the gas is used to run a prime mover such as an engine or turbine, the prime mover runs a generator which powers a portable blockchain mine.

An upstream oil and gas blockchain mining apparatus is disclosed comprising an oil and gas treating facility consists of a flare, incinerator, combustor or burner; excess gas is taken off the inlet line of the flare and redirected to a prime mover such as a natural gas engine, turbine or boiler, the prime mover runs a generator which powers a portable blockchain mining device.

A portable blockchain mining apparatus is disclosed comprising an enclosure containing the blockchain mining equipment, the enclosure having a ventilation mechanism, to dissipate the heat produced by the mining processors, for example one or more of an air supply fan, an exhaust fan, louvers, and others, the enclosure having a satellite, radio or cellular antenna to provide a connection to the internet, the enclosure containing network equipment such as a modem and network switch, the enclosure designed to be portable such as trailer mounted, the enclosure being insulated from the elements, the enclosure containing a natural gas aspirated engine and a generator to power the mining equipment, and the engine may comprise a turbine, where the enclosure is an intermodal shipping container, where the enclosure has a chiller or air cooling means fitted to it, the enclosure having a back-up heating means, such as a space heater, to be used to pre-heat the enclosure in case of shut down in cold weather.

In various embodiments, there may be included any one or more of the following features: The oil production, storage, or processing facility comprises a remote oil well. The oil production, storage, or processing facility comprise an oil storage or processing unit. The system is isolated from a sales gas line and an external electrical power grid. The source of combustible gas comprises the remote oil well; and the remote oil well is connected to produce a continuous flow of combustible gas to power the generator. A combustion engine is connected to the source of combustible gas and connected to drive the generator. The combustion engine is a prime mover that is connected to produce oil from the remote oil well. The combustion engine is a first combustion engine, and further comprising a second combustion engine that is a prime mover that is connected to produce oil from the remote oil well. The source of combustible gas comprises an oil storage or processing unit with a gas outlet connected to supply combustible gas to operate the generator; and the oil storage or processing unit is connected to receive oil produced from a remote oil well. The generator and blockchain mining device are located adjacent to the oil production, storage, or processing facility, for example adjacent to the remote oil well. The remote oil well comprises a plurality of remote oil wells, and one or both of the following conditions are satisfied: the plurality of remote oil wells are located on a multi-well pad; or the plurality of remote oil wells include a satellite well. The blockchain mining device has a network interface and a mining processor; the network interface is connected to receive and transmit data through the internet to a network that stores or has access to a blockchain database; and the mining processor is connected to the network interface and adapted to mine transactions into blocks associated with the blockchain database and to communicate with the blockchain database. The network is a peer to peer network; the blockchain database is a distributed database stored on plural nodes in the peer to peer network; and the blockchain database stores transactional information for a digital currency. A controller is connected to modulate a power load level exerted by the blockchain mining device on the generator, by increasing or decreasing the mining activity of the mining processor. The mining processor comprises a plurality of mining processors; and the controller is connected to modulate the maximum power load level by increasing or decreasing a maximum number of mining processors that are engaged in mining. The source of combustible gas comprises the remote oil well, which is connected to produce a continuous flow of combustible gas to operate the generator. The controller is connected to modulate the power load level in response to variations in a production rate of combustible gas from the remote oil well. A production rate of combustible gas from the remote oil well varies between a daily minimum production rate and a daily maximum production rate; and while the production rate is above the daily minimum production rate, the controller is set to limit the power load level to at or below a power level producible by the generator when the production rate is at the daily minimum production rate. The controller is set to divert to a load bank excess electricity produced by the generator. A production rate of combustible gas from the remote oil well varies between a daily minimum production rate and a daily maximum production rate; the controller is set to limit the power load level to above a power level producible by the generator when the production rate is at the daily minimum production rate; and a backup source, of fuel or electricity, is connected make up a shortfall in fuel or electricity, respectively, required to supply the blockchain mining device with the power load level. A controller is connected to operate a ventilation, heating and cooling system to maintain the blockchain mining device within a predetermined operating range of temperature. The blockchain mining device is mounted on a skid or trailer. The skid or trailer comprises a generator driven by an engine, which is connected to the source of combustible gas. The engine comprises a turbine. The generator and engine may be mounted integral to the skid, trailer, or blockchain mining device. The blockchain mining device comprises an intermodal transport container. Prior to using the source of combustible gas: disconnecting the source of combustible gas from a combustible gas disposal device at the hydrocarbon production well, storage, or processing facility; and connecting the source of combustible gas to operate the blockchain mining device. Connecting the source of combustible gas to operate the blockchain mining device; and diverting gas from a combustible gas disposal or storage device to operate the blockchain mining device. The combustible gas disposal or storage device comprises one or more of a flare, a vent to the atmosphere, an incinerator, or a burner. The hydrocarbon production well, storage, or processing facility comprises an oil or gas well that is isolated from a sales gas line and an external electrical power grid. The source of combustible gas is a remote oil or gas well, and further comprising producing a continuous flow of combustible gas to power a generator connected to operate the blockchain mining device. Producing further comprises supplying combustible gas to a combustion engine that is connected to drive the generator. The source of combustible gas is a remote oil well, and further comprising using the combustion engine as a prime mover to produce oil from the remote oil well. Prior to using the source of combustible gas, the combustion engine is under loaded as the prime mover, and further comprising connecting the generator to a power takeoff connected to the combustion engine. The combustion engine is a first combustion engine, and further comprising: prior to supplying combustible gas to the first combustion engine, connecting the first combustion engine to receive combustible gas from the remote oil well; and using a second combustion engine as a prime mover to produce oil from the remote oil well. Operating the blockchain mining device to: mine transactions with the blockchain mining device, for example by mining the most recent block on the blockchain with the blockchain mining device; and communicate wirelessly through the internet to communicate with a blockchain database. Modulating, using a controller, a power load level exerted by the blockchain mining device on the generator, by increasing or decreasing the mining activity of the blockchain mining device, for example the mining activity of plural mining processors contained within the blockchain mining device. The blockchain mining device comprises a plurality of mining processors; and modulating comprises modulating the power load level by increasing or decreasing a maximum number of mining processors that are engaged in mining. Modulating comprises modulating the power load level in response to variations in a production rate of combustible gas from the remote oil or gas well. A production rate of combustible gas from the remote oil or gas well varies between a daily minimum production rate and a daily maximum production rate; and modulating comprises limiting, while the production rate is above the daily minimum production rate, the power load level to at or below a power level producible by the generator when the production rate is at the daily minimum production rate. One or more of: diverting to a load bank excess electricity produced by the generator; or diverting, to a combustible gas disposal or storage device, excess combustible gas supplied to operate the generator. A production rate of combustible gas from the remote oil or gas well varies between a daily minimum production rate and a daily maximum production rate; and modulating comprises limiting the power load level to above a power level produced by the generator when the production rate is at the daily minimum production rate; and supplying from a backup fuel or electricity source a shortfall in fuel or electricity, respectively, required to supply the blockchain mining device with the power load level. The power load level is limited to above a power level produced by the generator when the production rate is at the daily maximum production rate. The blockchain mining device may be replaced by a suitable mining device or data center. The prime mover is connected to drive a pump jack or a rotating drive head mounted to the remote oil well. The power unit comprises a generator driven by a power take off from the prime mover. A compressor is connected to pressurize natural gas supplied from the source of natural gas to the power unit. The source of combustible gas comprises raw natural gas. The remote oil well comprises a plurality of remote oil wells. The network interfaces comprises one or more of a satellite, cellular, or radio antenna, connected to a modem. Successfully mining a block by a mining processor provides a reward of the digital currency, and the reward is assigned to a digital wallet or address stored on a computer readable medium. Prior to using the source of combustible gas, disconnecting the source of combustible gas from a gas vent or combustion device; and connecting the source of combustible gas to operate the blockchain mining device. The source of vented or flared natural gas is derived from combustible vapors produced as a result of oil treating or processing, such as an oil storage tank, separating vessel, or a free water knockout. The source of vented or flared natural gas is sourced from the inlet line of a flare, incinerator, combustor or burner. Retrofitting an existing natural gas engine running a hydraulic pump to also run a generator, the generator powering a portable blockchain mine. Adding secondary prime movers such as natural gas internal combustion engines, turbines or boilers to run associated generators, the generators powering a portable blockchain mine. The mining load is sized at the low end of a variable vented or flared gas supply such that back-up fuel requirement usage is minimized, the excess gas over and about the amount required to fuel the mining load is vented or flared (combusted). The mining load is sized at the low end of a variable vented or flared gas supply such that back-up fuel requirement usage is minimized, the engine is controlled to throttle up or down based on the availability of excess gas so as to produce more torque, the additional torque generates excess power above that required to run the mining load, the excess power is directed to a load bank and dissipated as heat, and thus venting is minimized. The electrical load (of the mining hardware) is sized at the high end of a fluctuating excess or stranded gas supply such that venting or flaring is minimized or eliminated, where shortages in gas supply are made up from available back-up fuel such as propane or line gas. Changing the blockchain mine electrical load over time in response to changes in the excess or stranded gas volume availability. The mining load can be changed through the addition or removal of mining processors. Minimizing the vented or flared gas volumes by changing the mining hardware load in reaction to observed changes in average natural gas source rates over time. Minimizing the consumed back up fuel volumes by changing the mining hardware load in reaction to observed changes in average natural gas source rates over time.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 6 is a perspective view of an intermodal shipping container housing blockchain mining equipment for use at a remote oil or gas production, storage, or processing facility.

FIGS. 6A, 6B, and 6C are diagrams that illustrate a) a peer-to-peer network, b) a layout of hardware forming a single node in the peer-to-peer network, and c) a conceptual illustration of a blockchain database stored on an individual node, respectively.

DETAILED DESCRIPTION

Figure 1:
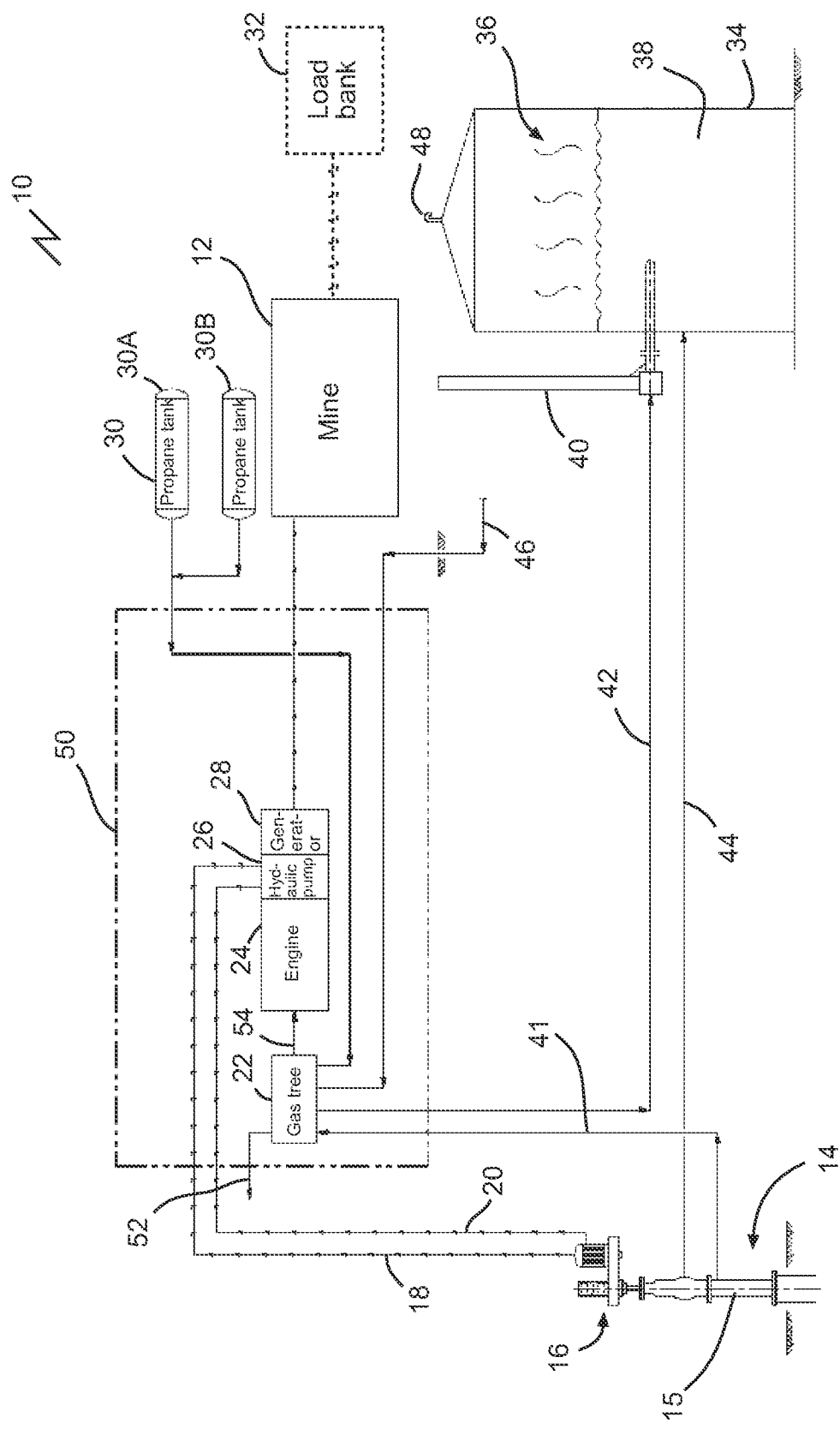
FIG. 1 is a schematic illustrating a system for powering a blockchain mine at a remote oil well using a generator retrofitted to a prime mover, which operates a drivehead to pump oil up from the reservoir.

Immaterial modifications may be made to the embodiments described here without departing from what is covered by the claims.

Natural gas is a naturally occurring combustible gas, often in the form of a mixture of hydrocarbon gases that is highly compressible and expansible. Methane ($CH_4$) is the chief constituent of most natural gas (constituting as much as 85% of some natural gases), with lesser amounts of ethane, propane, butane, and pentane. Impurities may also be present in large proportions, including carbon dioxide ($CO_2$), helium, nitrogen, and hydrogen sulfide ($H_2S$).

Natural gas may be produced from various sources. Natural gas may naturally separate from the oil stream as it is produced up the well and may be captured off the casing side of the well, the casing side referring to the annular space between the production tubing and the well bore or well casing if present. When natural gas is produced from an underground reservoir, it may be saturated with water vapor and may contain heavy hydrocarbon compounds as well as nonhydrocarbon impurities. Natural gas produced from shale reservoirs is known as shale gas. The composition of the gas stream is a function of the thermal maturity of the rock. Thermally immature rocks will contain heavier hydrocarbon components and may contain liquid components. Overmature reservoirs may contain appreciable quantities of $CO_2$. Natural gas may also be liberated out of solution from the oil as it is treated, such as in a tank on the well site or as it is undergoes further refinement at a downstream facility. In upstream production of oil and gas, natural gas may be produced as the primary product, for example from a gas well, or as a by-product of oil production, for example from an oil well.

Natural gas produced as a by-product of oil production may be used in various ways. The oil well operator may attempt to capture the gas and consume it, for example as on-site fuel for equipment or for instrumentation pressure. If there is an excess of natural gas that cannot be used on site, it may be desirable to sell the excess by tying the source into a pipeline network with a sales line to sell to a customer connected to the pipeline network. If the amount of gas is significant, it can be compressed or liquefied into storage vessels to be sold to market. If there is no pipeline network but there is a power grid, the operator may have the option to use the gas to generate electricity to sell to the power grid owner.

Raw natural gas may require processing before it can be sold via a sales gas line. In long distance transmission of sales gas by pipeline, the pressure is usually less than 1,000 pounds per square inch gage (PSIG). It is important that no liquids form in the line because of condensation of either hydrocarbons or water. Hydrocarbon liquids reduce the pipeline efficiency and might hold up in the line to form liquid slugs, which might damage downstream compression equipment. Condensed water can do the same damage. Additionally, water may form solid complexes (hydrates), which accumulate and block the line. Further, it may be economical to extract liquefiable hydrocarbon components, which would have a higher market value on extraction as compared with their heating value if left in the gas.

The end user of natural gas needs to be assured of two conditions before committing to the use of gas in a home or factory: the gas must be of consistent quality, meeting sales gas specifications, and the supply of gas must be available at all times at the contracted rate. Gas treating facilities, therefore, must be designed to convert a particular raw gas mixture into a sales gas that meets the sales-gas specifications, and such facilities must operate without interruption. Typical processing steps include inlet separation, compression, gas sweetening, sulfur recovery or acid gas disposal, dehydration, hydrocarbon dewpoint control, fractionation and liquefied petroleum gas (LPG) recovery, and condensate stabilization. Sales gas specifications may vary by jurisdiction, although Table 1 below illustrates a typical specification. A sales gas line may be a pipeline of more than ten km of length, in some cases more than fifty, a hundred, or two hundred, kilometers in length, and connecting between an oil and gas site and travelling to an end user, a processing site, or a distribution site.

TABLE 1

Typical Sales Gas Specification

| Component | Sales Gas Specification (maximum limits) |
|---|---|
| H2S (ppm) | 10-16 |
| O2 (mol. %) | 0.0 |
| CO2 (mol. %) | 2-3 |
| Moisture (mg/L and lb/mmscf) | 0.1-.16 (4-10) |

A source of natural gas may be located at a remote oil and gas site, for example one that is lacking in accessible infrastructure such as an external pipeline network (sales line) or external power grid to sell into. In many locations it may not be economically feasible to build the infrastructure required to take the produced gas, or resultant electricity generated by combustion of the gas, to market, for example due to significant capital expense required or when the volume of gas is insufficient to pay out the investment. In such cases, the operator is forced to do something with the excess or stranded gas and is left with few options. Such options currently include venting the gas to atmosphere un-combusted, combusting the gas on site via flare, incinerator, or combustor, or worst case scenario ceasing production of the gas source, for example shutting in the oil well.

Venting excess gas to atmosphere is the most cost effective option for the operator but may have the most negative impact on the environment, as excess natural gas is regarded as 25-35 times worse than $CO_2$ as a greenhouse gas on a 100 year global warming potential timescale. Currently, venting gas to atmosphere is a common occurrence in oil production all over the world, as few jurisdictions restrict this practice.

Combustion disposal options, while more environmentally friendly than venting, represent a significant capital expense and do not provide utility for the operator. Combustion options include, but are not limited to, flaring and incineration. Combustion disposal methods produce waste heat and essentially represent waste of the potential energy of the gas. Such options may represent a capital liability to the operator, as such do not generate any revenue. Both combustion and venting can pose health concerns to nearby residents and are typically considered a nuisance.

Selling excess gas to a pipeline, i.e. a sales gas line, or using the gas to generate electricity to sell to an external power grid may be ideal options, but such options may require a significant capital expense when there is no infrastructure nearby. To pay off the capital expense, the volume of excess gas must be significant and the supply must also be guaranteed for the payout period. This is often not the case in many upstream oil production activities, as gas volumes associated with oil production can quickly diminish. Many remote oil and gas sites are located in unpopulated areas that are hundreds of kilometers outside of the nearest town, and of which no viable sales option is economically feasible.

An external power grid may be an electrical power transmission system comprising overhead or underground wiring, often supplying electricity in polyphase form, and spanning an electrical substation to an oil and gas site. Long-distance electricity transmission is typically carried with high voltage conductors. Transmission lines traverse large regions and require numerous support towers, often spanning hundreds of kilometers from generation to distribution and end use. Substations transform power from transmission voltages to distribution voltages, typically ranging from 2400 volts to 37,500 volts.

Figure 2:
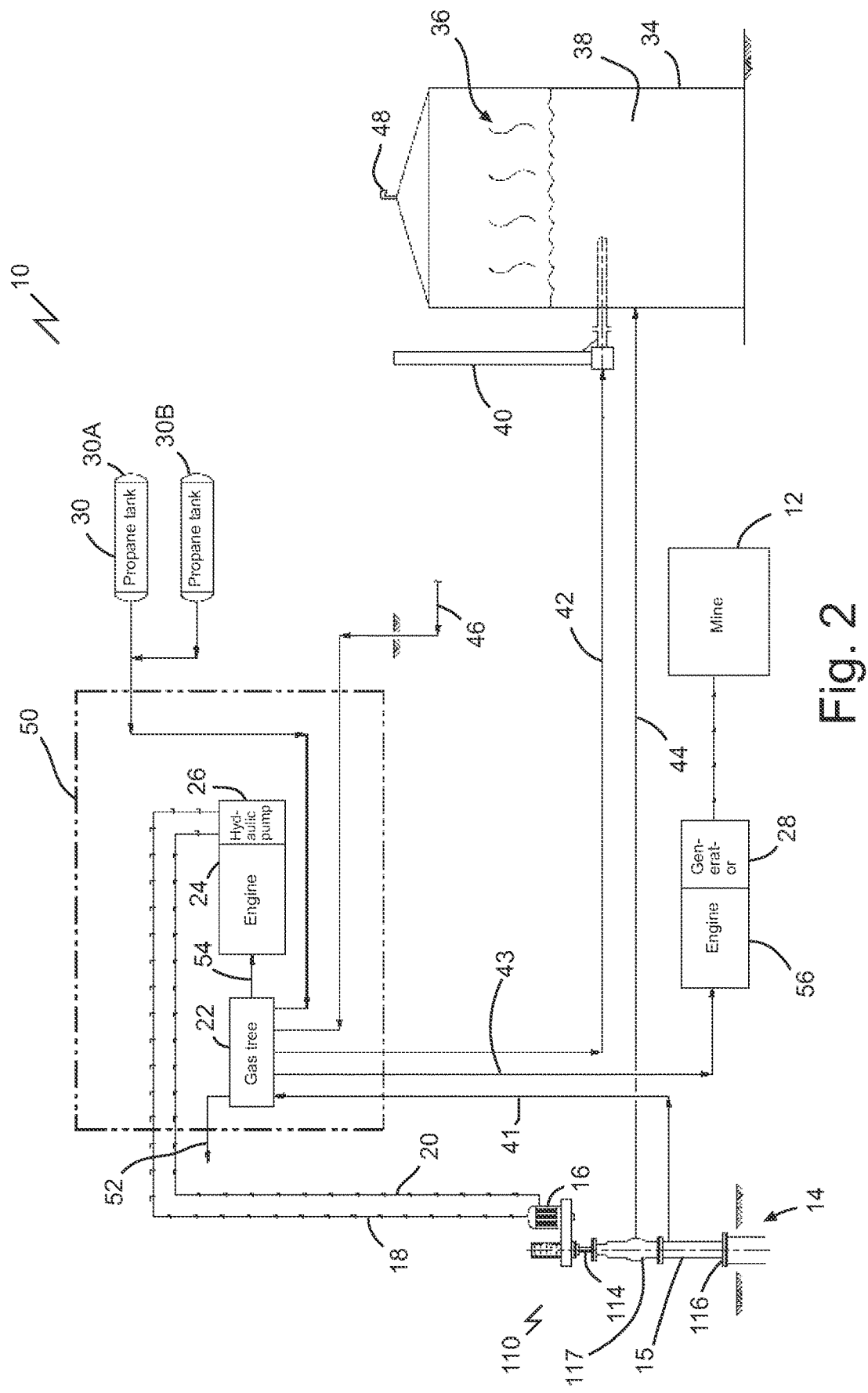
FIG. 2 is a schematic illustrating another embodiment of a system for powering a blockchain mine at a remote oil well, with a prime mover (engine) operating the drivehead, and another engine and generator connected to the remote well for powering the blockchain mine independent of the prime mover that operates the drive head.
Figure 3:
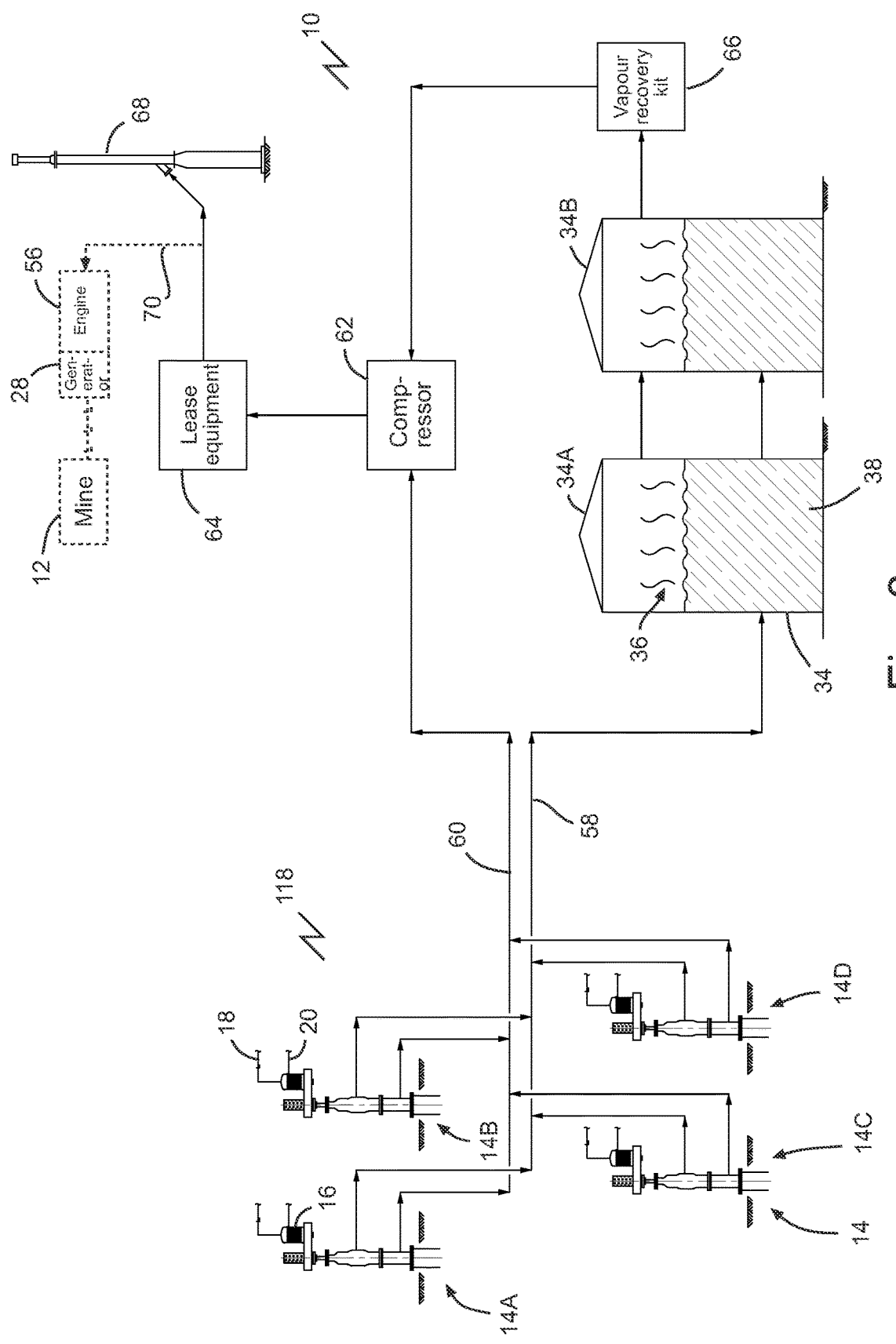
FIG. 3 is a schematic illustrating another embodiment of a system for powering a blockchain mine, in which a generator and engine are connected to be powered by combustible gas taken off of an oil storage unit to power the blockchain main.

Referring to FIGS. 1-3, a system 10 is illustrated comprising a source of combustible gas, for example natural gas or another hydrocarbon gas, produced from a hydrocarbon production, storage, or processing facility, in this case a remote oil well 14, a power unit such as a generator 28, and a blockchain mining device 12. The generator 28 is connected to produce electricity from the source of natural gas. The data mining or blockchain mining device 12 is connected to the generator 28, for example connected to receive electricity from or be powered by the generator 28. Referring to FIG. 2, an oil well 14 may include a suitable production tree 110, which may include a drivehead 16, a stuffing box 114, a flow tee 117, and a casinghead 15, all mounted on a wellhead 116.

Referring to FIGS. 1-3, the remote oil or gas well 14 may be isolated from one or more of a sales gas line or external power grid. Isolated may refer to the fact the no sales gas line or external power grid, as the case may be, is located within a distance that would be economically feasible to connect into, for example such infrastructure may be more than five, ten, fifty, or a hundred kilometers away. Oil and gas production, storage, and processing assets are often distributed across remote locations. For example, well-sites can be remote and isolated from conventional communications equipment making the retrieval of well-site data difficult and unreliable. Some locations can be so remote, that periodic on-site visits are required to manually or semi-manually retrieve data. Some locations are only accessible via off-road vehicles or helicopter.

Referring to FIGS. 1-2, the combustible gas used in the systems and methods in this document may be natural gas, such as raw natural gas and/or casing gas. Casing gas, also known as casinghead gas, is gas produced as a byproduct from a producing oil well 14. Referring to FIG. 1, casing gas is taken from the well 14 through the casinghead 15 at the top of the well 14. The casinghead 15 is in fluid communication with the annulus defined between the production tubing and the well bore or well casing lining the well bore. The casinghead may feed raw natural gas via supply line 41 to a gas tree 22, which may distribute the gas to the various pieces of equipment on site that may use or dispense of the gas. Raw gas may be a gas directly produced from the well, or otherwise unprocessed. Raw gas may contain natural gas liquids (condensate, natural gasoline, and liquefied petroleum gas), water, and some other impurities such as nitrogen, carbon dioxide, hydrogen sulfide and helium.

Referring to FIGS. 1-3, the generator 28 and blockchain mining device 12 may be positioned at a suitable location relative to the hydrocarbon well, storage site, or processing facility, such as remote oil well 14. The generator 28 and blockchain mining device 12 may be located adjacent to the remote oil well 14, for example within one hundred meters. The generator 28 and blockchain mining device 12 may be located further distances away, for example within one kilometer of the remote oil well 14. Relatively longer distances may permit the device 12 to be powered by combustion of gas from plural wells 14 as described below.

Referring to FIGS. 1-2, as above, system 10 may be located at a remote oil well. In the examples shown, the source of combustible gas comprises the remote oil well, 14. As the source of gas the remote oil well 14 may be connected to produce a continuous flow of combustible gas to power the generator 28, for example by supply of combustible gas to a combustion engine 24 that is connected to drive the generator 28.

Referring to FIG. 1, at a remote oil well site an internal combustion engine 24, such as a motor, may be set up to operate as, or to drive, a prime mover, such as a pump jack or rotating drivehead 16, which is connected to produce oil from the remote oil well 14. A prime mover in this document refers to any machine that converts energy from a source energy into mechanical energy, as a motive power source providing energy to move the components that pump oil from the well 14. A pumpjack converts the rotary motion of a driveshaft of the engine 24 to a vertical reciprocating motion of a walking beam to raise and lower the pump shaft (polished rod) to operate a downhole pump positioned at the base of production tubing in the well. A rotating drivehead 16 is a top side motor that rotates the polished rod to operate a downhole moineau or progressing cavity pump, which in turn drives oil up the production tubing to surface. Driveheads and pumpjacks are examples of artificial lift systems, other examples of which include bottom hole motors. A rotating drivehead may incorporate a hydraulic motor that is driven by a hydraulic pump 26, which is driven by the prime mover or engine 24, for example via supply and return hydraulic lines 18 and 20. At many remote oil wells 12 the prime mover or engine 24 is connected to receive as fuel natural gas from the source of combustible gas, in this case well 14, for example via gas tree 22 and supply line 54.

Referring to FIG. 1, the prime mover engine 24 may be connected to drive the generator 28. In one case the generator 28 is connected, in some cases retrofitted, to a power takeoff on the engine 24, such as a drive shaft. In some cases the drive shaft also operates the hydraulic pump 26, or drives the gearbox of a pumpjack. The remote oil well 14 may produce natural gas as a by-product off an annulus of the well 14 or other space between adjacent sections of piping, tubing, and/or casing positioned within the well 14. The generator 28 may be any device that converts mechanical energy to electrical energy, such mechanical energy being converted from energy of combustion of the combustible gas. The engine 24 may be a natural aspirated internal combustion engine. The combination of the generator 28 and the engine 24 may be referred to as a genset or engine-generator. The generator 28 may be an alternator, a gas turbine generator, a boiler coupled with a steam-powered generator, or other suitable devices.

Referring to FIG. 1, the generator 28 may be used to leverage excess energy available when the prime mover engine 24 is under loaded. For example, an engine 24 may be rated at 60 or higher horsepower, but may actually only require 20-30 horsepower to pump the well 14. In such a case the well 14 is a good candidate for retrofitting a generator 28 to leverage the excess power capacity of the engine 24. The generator 28 may thus be connected, for example through a power takeoff, to the combustion engine 24. In other cases the generator 28 may be connected to a mechanical energy source elsewhere in the existing power train, for example to the gearbox or crank assembly of a pump jack, or to a hydraulic motor connected to the pump 26. In other cases, the well site may have an existing generator 28 in place, for example already connected to be driven by the engine 24, and in such a case the mining device 12 may be connected to such generator 28 to receive power for operations.

Referring to FIG. 2, the mining device 12 may be powered by a generator 28 that is retrofitted, or already present, at a well site independent of the prime mover engine 24. One or more such components may be housed in an enclosure such as an engine building 50. In the example shown during operation the generator 28 is connected to be driven by an engine 56, referred to as a first engine, while a second engine 24 is present to act as the prime mover to pump the well 14. Prior to using the combustible gas to power the mining device 12, a user may connect the generator 28 to an existing engine 56, or may connect a gen-set comprising engine 56 and generator 28 to the gas supply, such as through lines 43 connected to a gas tree 22 on site. The engine 56 and generator 28, or just the generator 28, may be supplied as part of the mining device 12 in some cases, for example as a skid or trailer-mounted unit, in order to provide a turnkey or plug-and-play system that may be transported to the well 14, hooked up to the gas supply or tree 22, and operated.

Referring to FIG. 3, the mining device 12 may be powered by gas from a plurality of sources, such as a plurality of remote oil wells 14A-D. The plurality of remote oil wells 14A-D may be located on a multi-well pad 118, for example a plurality of horizontal wells that penetrate the same hydrocarbon reservoir. The plurality of remote oil wells 14A-D may include one or more satellite wells. A satellite well includes a well that is separate from a main group of wells or another well, but whose production is directed to a common processing facility. A satellite well may include a well that penetrates the same hydrocarbon reservoir as other wells in the plurality of wells. Each of the plurality of remote oil wells 14A-D may have respective casinghead gas lines 60 and oil or emulsion lines 58, which in the examples shown are bussed or grouped together, though such grouping is not necessary and in some cases independent lines may be used for each well or a group of one or more wells. The gas supply line or lines 60 may feed an engine 56 that drives a generator 28 that powers a mining device 12.

Referring to FIG. 3, the source of combustible gas may be an oil storage or processing unit, for example a production storage tank or tanks 34A-B. The tanks 34 may store emulsion, for example a mixture of oil and water, which may be supplied via one or more emulsion or oil lines 58 from wells 14A-D. The source of natural gas may comprise oil storage production tank 34 connected to receive oil produced from the remote oil well 14. Oil storage production tank 34 may store, and in some cases separate, emulsion 38, which may release vapor such as combustible gas 36 over time. A gas outlet, such as a vapor recovery unit 66, may be connected to supply natural gas from the oil storage production tank 34 to the engine 56. A compressor 62 or other suitable device may be used to pressurize the gas supplied to engine 56. The engine 56 and generator 28 may form a standalone unit or may be connected for other functions on the site, such as to pump a well or power communications or electrical equipment. Pressurized natural gas from compressor 62 may be used to fuel lease equipment 64, such as control equipment, communications equipment, surveillance equipment, heaters, or other components. Excess or unused gas may be directed to a gas disposal or storage device such as an atmospheric vent or combustion device, in this case a flare 68. Gas may be diverted from flare 68 to engine 56 via an excess gas line 70.

Referring to FIG. 3, in some cases a method of installing the system 10 on site includes reducing the amount of combustible gas that is wasted on site. For example, the method of install may include disconnecting the source of combustible gas, in this case from tanks 34 and/or line 60, from an atmospheric vent or combustion device, in this case flare 68, or to atmosphere via a vent 52 (FIG. 1). The source of combustible gas may be initially connected to operate the blockchain mining device 12. Once disconnected, the atmospheric vent or combustion device may be unused in the future, or may be used only in certain circumstances. In some cases combustible gas is diverted at least partially from the atmospheric vent or combustion device to operate the blockchain mining device 12, so that relatively less gas is wasted during operation. In such cases the flare 68 may remain connected to the source of gas, for example to receive a lesser feed of gas than prior to the installation of mining device 12, and in other cases to receive diverted excess gas in certain circumstances for example as described further elsewhere in this document. An atmospheric vent or combustion device is an example of a gas disposal device, and includes a flare, a vent to the atmosphere, an incinerator, a burner, and other suitable devices.

A blockchain is a form of database, which may be saved as a distributed ledger in a network of nodes that maintains a continuously-growing list of records called blocks. Each block contains a timestamp and a link to a previous block. The data in a block cannot be altered retrospectively without significant computational effort and majority consensus of the network. The first blockchain was conceptualized by Satoshi Nakamoto in 2008 and implemented the following year as a core component of the digital currency, BITCOIN™, where it serves as the public ledger for all transactions. Through the use of a peer-to-peer network and a distributed timestamping server, a blockchain database is managed autonomously. The administration of BITCOIN™ currency is currently the primary use for blockchain technology, but there are other use cases for blockchain technology to maintain accurate, tamper-proof databases. Examples include maintaining records of land titles and historical events. While the potential in blockchain technology is vast, BITCOIN™ remains the most widely used today.

By design blockchains are inherently resistant to modification of the data—once recorded, the data in a block cannot be altered retroactively without network consensus. Blockchains are an open, distributed ledger that can record transactions between two parties efficiently and in a verifiable and permanent way. The ledger itself can also be programmed to trigger transactions automatically. Blockchains are secure by design and an example of a distributed computing system with high byzantine fault tolerance. Decentralised consensus can therefore be achieved with a blockchain. This makes blockchains suitable for the recording of events, medical records, and other records management activities, identity management, transaction processing and proving provenance. This offers the potential of mass disintermediation and vast repercussions for how global trade is conducted.

A blockchain facilitates secure online transactions. A blockchain is a decentralized digital ledger that records transactions on thousands of computers globally in such a way that the registered transactions cannot be altered retrospectively. This allows the participants to verify and audit transactions in an inexpensive manner. Transactions are authenticated by mass collaboration powered by collective self-interests. The result is a robust workflow where participants' uncertainty regarding data security is marginal. The use of a blockchain removes the characteristic of infinite reproducibility from a digital asset. It confirms that each unit of digital cash was spent only once, solving the long-standing problem of double spending. Blockchains have been described as a value-exchange protocol. This exchange of value can be completed more quickly, more safely and more cheaply with a blockchain. A blockchain can assign title rights because it provides a record that compels offer and acceptance. From the technical point of view a blockchain is a hashchain inside another hashchain.

A blockchain database may comprise two kinds of records: transactions and blocks. Blocks may hold batches of valid transactions that are hashed and encoded into a Merkle tree. Each block may include the hash of the prior block in the blockchain, linking the two. Variants of this format were used previously, for example in Git, and may not by itself be sufficient to qualify as a blockchain. The linked blocks form a chain. This iterative process confirms the integrity of the previous block, all the way back to the original genesis block. Some blockchains create a new block as frequently as every five seconds. As blockchains age they are said to grow in height. Blocks are structured by division into layers.

Sometimes separate blocks may be validated concurrently, creating a temporary fork. In addition to a secure hash based history, each blockchain has a specified algorithm for scoring different versions of the history so that one with a higher value can be selected over others. Blocks that are not selected for inclusion in the chain are called orphan blocks. Peers supporting the database don't have exactly the same version of the history at all times, rather they keep the highest scoring version of the database that they currently know of. Whenever a peer receives a higher scoring version (usually the old version with a single new block added) they extend or overwrite their own database and retransmit the improvement to their peers. There is never an absolute guarantee that any particular entry will remain in the best version of the history forever, but because blockchains are typically built to add the score of new blocks onto old blocks and there are incentives to only work on extending with new blocks rather than overwriting old blocks, the probability of an entry becoming superseded goes down exponentially as more blocks are built on top of it, eventually becoming very low. For example, in a blockchain using the proof-of-work system, the chain with the most cumulative proof-of-work is always considered the valid one by the network. In practice there are a number of methods that can demonstrate a sufficient level of computation. Within a blockchain the computation is carried out redundantly rather than in the traditional segregated and parallel manner.

Maintaining a blockchain database is referred to as mining, which refers to the distributed computational review process performed on each block of data in a block-chain. This allows for achievement of consensus in an environment where neither party knows or trusts each other. Those engaged in BITCOIN™ mining are rewarded for their effort with newly created BITCOIN™s and transaction fees, which may be transferred to a digital wallet of a user upon completion of a designated task. BITCOIN™ miners may be located anywhere globally and may be operated by anyone. The mining hardware is tied to the blockchain network via an internet connection. Thus, little infrastructure is needed to operate and contribute to the system. All that is required to become a BITCOIN™ miner is the appropriate computer hardware, an internet connection and low cost electricity. The cheaper the electricity the more reward the miner will receive relative to competition, other miners.

Mining is the process of adding transaction records to BITCOIN™'s public ledger of past transactions. This ledger of past transactions is called the blockchain as it is a chain of blocks. The blockchain serves to confirm transactions to the rest of the network as having taken place. BITCOIN™ nodes use the blockchain to distinguish legitimate BITCOIN™ transactions from attempts to re-spend coins that have already been spent elsewhere Mining may be intentionally designed to be resource-intensive and difficult so that the number of blocks found each day by miners remains steady. Individual blocks may be required to contain a proof-of-work to be considered valid. This proof-of-work is verified by other BITCOIN™ nodes each time they receive a block. BITCOIN™ uses the hashcash proof-of-work function.

One purpose of mining is to allow BITCOIN™ nodes to reach a secure, tamper-resistant consensus. Mining may also be the mechanism used to introduce BITCOIN™s into the system: Miners are paid any transaction fees as well as a subsidy of newly created coins. This both serves the purpose of disseminating new coins in a decentralized manner as well as motivating people to provide security for the system. BITCOIN™ mining is so called because it resembles the mining of other commodities: it requires exertion and it slowly makes new currency available at a rate that resembles the rate at which commodities like gold are mined from the ground.

Mining requires computational effort in the form of CPU cycles (CPU=central processing unit or central processor) to run a cryptographic hashing algorithm associated with the particular blockchain protocol. For a given mining processor, one can modify the computational effort through changing the core voltage or the clock rate of the processor. Doing so may result in more or less power consumed by the mining processor, and in some embodiments within this document such changes are described as changing the mining activity, or hashrate.

As the total network computational effort (or hashrate) increases on a blockchain over time, the probability for an individual miner to find a block and receive a reward diminishes. Today the BITCOIN™ network is so large that most individuals engaged in mining BITCOIN™ typically mine in pools using protocols such as the Stratum Mining Protocol. This allows individual miners to increase their reward frequency as a trade-off for splitting the block reward with the rest of the pool. Miners who are pool mining do not need the associated equipment needed to run a mining node as they only need compute and submit proof-of-work shares issued by the mining pool.

Since the energy cost of running blockchain mining equipment is its primary operating cost, a trend towards mining on low-cost hydroelectric power has become prevalent. This trend has promoted the centralization of blockchain miners in specific countries with abundant hydroelectric power, as miners who do not have access to cheap hydroelectricity cannot mine profitably because they are competing with the miners who do have access. BITCOIN™ mining centralization has been occurring in China where there is abundant low cost hydroelectric power. Centralization in blockchain mining is undesirable because the premise behind the blockchain innovation is not to have to trust a third party and to have inherent confidence and security through a decentralized, distributed network. There exists a need to further decentralize BITCOIN™ and other blockchain mining through a more decentralized source of low-cost power.

Referring to FIG. 6A, a blockchain network may be a peer to peer network 120 accessible via the internet. The blockchain database may be stored as a distributed database 132 on plural nodes 122, for example nodes 122A-F, in the peer to peer network 120. A protocol may be put in place to ensure that each copy of the database on each node is updated in a reliable fashion when one copy is updated on one node. Each copy of the blockchain database may store transactional information for a digital currency such as BITCOIN™. Nodes 122A-F may be electronic devices 126, for example desktop computers, laptop computers, tablet computers, cellular telephones, servers, or other suitable devices. Nodes 122A-F may communicate with one another over wired or wireless communication paths 138, for example through the internet. Each path 138 may be created through communication via switches, routers, modems, and other network equipment. Network 120 may include any number of nodes, for example tens, hundreds, thousands, millions, or more nodes. Nodes 122A-F may communicate to maintain a distributed global ledger of all official transactions. One or more of the nodes 122A-F may store a copy of the global ledger, for example a complete copy of the global ledger or a partial copy of the global ledger.

Referring to FIG. 6B, each node 122 may correspond to and be defined by a physical device 126, such as a computer. Device 126 may have one or more of storage and processing circuitry 128 and mining circuitry 130 if the node operates as a miner. Storage and processing circuitry 128 may have storage circuitry, for example hard disk drive storage, non-volatile memory such as flash memory or other electrically-programmable-read-only memory configured to form a solid state drive, or volatile memory such as static or dynamic random-access-memory. Processing circuitry of storage and processing circuitry 128 may be used to control the operation of device 126. Storage circuitry 128 may store one or more copies of a portion or the entirety of the distributed database 132. Such processing circuitry may include suitable hardware components such as microprocessors, microcontrollers, and digital signal processors, or dedicated processing circuits such as application specific integrated circuits Mining circuitry 130, for example an integrated circuit chip, may be used to perform data mining operations, for example verifying cryptocurrency transactions. Network communication hardware 131 may be used to communicate with other nodes and the network in general.

Referring to FIGS. 6A-B, every transaction added to the global ledger via nodes 122 may be verified by other the other nodes to help ensure validity of the ledger. Successfully mining a block may provide a reward of the digital currency, wherein, the processor circuitry 128 or another processor may assign the reward to a digital wallet or address stored on a computer readable medium.

Referring to FIG. 6C, storage and processing circuity 128, may maintain or store a blockchain database 132. The blockchain database 132 may store data as a series of interconnected blocks 134, for example blocks 134A-C. Each block 134 may have a respective header and contents and the header may contain the previous block's hash. Such information may be used in linking a new block, for example block 136, into the blockchain database 132. A new block 136 may be added to the chain as transactions are verified and confirmed into the blockchain. The integrity of the blockchain may be verified by known methods, and the linking of each block to previous blocks acts to create a liable and traceable path of title to anonymously but reliably verify a chain of title for a specific quantity of currency that has been the subject of one or more transactions.

Figure 4:
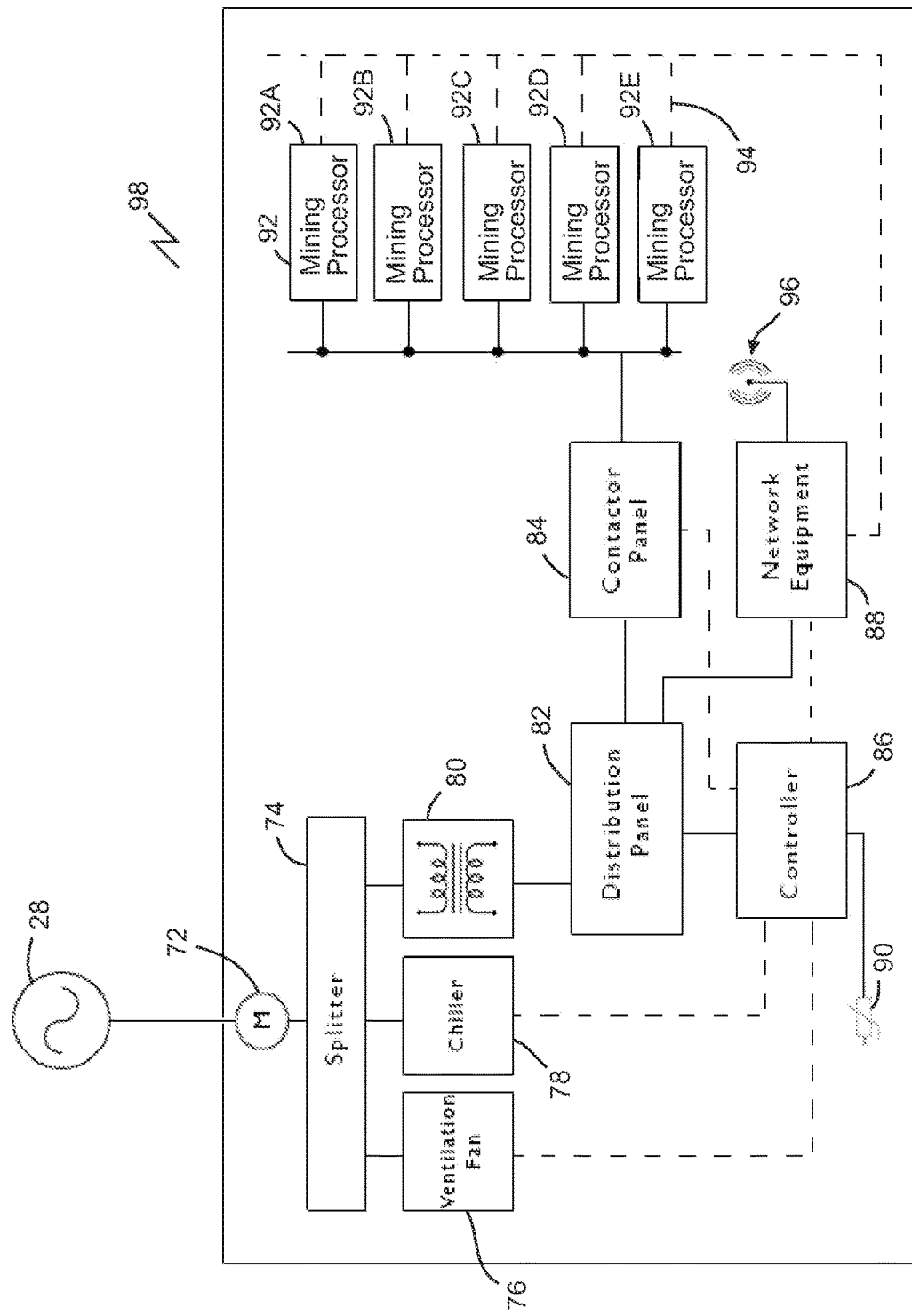
FIG. 4 is a schematic depicting a blockchain mining device with a plurality of mining processors and associated control and network equipment housed within a portable enclosure.

Referring to FIG. 4, each blockchain mining device 12 may be composed of suitable components. The blockchain mining device 12 may have a network interface, such as network equipment 88, and one or a plurality of mining processors 92 (92A-92E for example). The network interface may be connected to receive and transmit data through the internet to a node on the network 120 (FIG. 6A), or to a mining pool (not shown), that stores or has access to a blockchain database, which may be for a digital currency. The mining processor or processors may be connected to the network interface and adapted to mine new transactions into the blockchain database and to communicate with the blockchain database. Referring to FIG. 4, the network interface or interfaces (network equipment 88) may have a configuration suitable for receiving and transmitting data through the internet to the network. Referring to FIG. 6, a network interface may comprise one or more communication device such as a network antenna 96A, a satellite antenna or dish 96B, a cellular antenna, or a radio antenna. The network equipment 88 may include or be connected to a modem.

Referring to FIG. 6, system 10 may be mounted within a portable enclosure 98 suitable for transporting blockchain mining device 12 between locations. The blockchain mining device 12 (FIG. 1) may be skid or trailer-mounted. The blockchain mining device 12 may be located in a portable enclosure 98, for example an intermodal transport container as shown. The portable enclosure 98 may have an access door 102 such as a man door, for example to permit entry and exit of a person such as equipment maintenance staff into and out of the enclosure 98. Portable enclosure 98 may have an end gate 100 to permit entry and exit of data mining equipment, for example mining processors 92, or power generating equipment such as engine 56 and generator 28, into and out of the enclosure 98. One or more network communications equipment 96, for example network antenna 96A such as a cellular network antenna or radio network antenna and/or satellite internet dish 96B may be mounted to the enclosure 98, for example to a top side 98A of the enclosure 98 or at another suitable location. Enclosure 98 may have an air supply, such as a centrifugal fan 106, for example driven by a motor 104, in order to cool and ventilate internal components to prevent system downtime or damage from overheating. Enclosure 98 may have one or more exhaust fans 108 and/or louvers, for example to facilitate air flow out of, or into, enclosure 98 for heat dissipation from enclosure 98. Enclosure 98 may have an air supply, such as an air supply fan 106, and may have an air supply filter (not shown) and conditioning equipment such as a dehumidifier (not shown) to provide a quality air supply for the enclosure 98.

Referring to FIG. 6, an intermodal container is a relatively large rectangular box-shaped standardized shipping container, designed and built for intermodal freight transport, meaning these containers can be used across different modes of transport—from ship to rail to truck—without unloading and reloading their cargo. Intermodal containers are primarily used to store and transport materials and products efficiently and securely in the global containerized intermodal freight transport system, but smaller numbers are in regional use as well. These containers are known under a number of names, such as simply container, cargo or freight container, ISO container, shipping, sea or ocean container, container van or (Conex) box, or seacan. Intermodal containers exist in many types and a number of standardized sizes, but ninety percent of the global container fleet are so-called dry freight or general purpose containers, which are durable closed steel boxes, mostly of either twenty or forty foot standard length. Common heights are 8 feet 6 inches and 9 feet 6 inches—the latter are known as High Cube or Hi-Cube containers. Intermodal containers often include corrugated walls 101 for strength. Each corner of the container may include a twistlock fitting 103 for securing the container to other containers and to various transportation devices such as a container trailer for a road-based tractor unit. Reinforcing beams 105 may span the edges of the container, for example the vertical columns that make up the four corners between sidewalls, and the horizontal beams that make up the longitudinal and lateral side edges of the base of the container.

Referring to FIG. 4, an example layout is illustrated of the components that may make up a mining device 12. The enclosure 98 may contain one or more of a meter 72, a splitter 74, a ventilation fan 76, a chiller 78, a step-down transformer 80, a distribution panel 82, a contactor panel 84, a controller 86, network equipment 88 such as a modem and a network switch, a thermistor or temperature sensor 90, and one or more mining processors 92 such as processors 92A-E. The generator 28 provides power to the mining device 12. In some cases, the power is metered via meter 72 so the user can know how much to pay the owner of the gas, and then the power may be split up.

Referring to FIG. 4, the generator 28 may produce polyphaser power, such as three phase power, which may be useful to run large loads such as the ventilation fan 76 and chiller 78. The power may travel into a step-down transformer 80. A transformer 80 may or may not be required depending on what voltage the generator makes. Transformer 80 may convert the input voltage to the required voltage to run the rest of the equipment. The transformer or transformers 80 may also convert the three phase power to single phase power. After the transformer the power may travel into a distribution panel 82. The panel 82 may feed power into the rest of the equipment. A contactor panel 84 may be used to switch on and off various mining processor circuits each connected to one or more mining processors 92. Different mining processor circuits may be designed for different voltages, as some mining processor power supplies run on 120V, and some run on 208V.

Referring to FIG. 4, the network equipment 88 block may provide a source of internet connection. A satellite/cellular/ and/or radio antenna or other network communication equipment 96 may be fitted on the mining device 12 and connected to a modem. The modem may feed a network switch that has ethernet ports. Each mining processor controller may need one ethernet port. The network connection may also feed a controller or controllers 86, which may be a programmable logic controller (PLC), which may be accessed remotely. The controller 86 may be connected to at least a thermistor 90 (temperature sensor) within the mining device 12, to allow the controller 86 to control the ventilation and chilling loads within the enclosure 98. The controller 86 may control the contactor panel 84 switches to open and close circuits to add or remove mining processors 92 from operation. Each mining processor 92 may have a variety of configurations, but generally may include at least a power supply, a controller board and mining circuitry, such as an ASIC circuit. Various mining circuitry examples include CPU (central processing unit), GPU (graphics processing unit), FPGA (Field-Programmable Gate Array), and ASIC (application specific integrated circuit). The components of an ASIC mining processor include the hash boards (each board has numerous chips that is doing the hashing), a controller (to communicate with the network and optimize the mining processors chip frequency and fans for cooling), and a power supply (typically converts AC input power to DC power for the ASIC). Each mining processor 92 may be positioned on racks or shelving units.

Referring to FIG. 4, the blockchain mining device 12 may comprise a controller 86 connected to operate one or more aspects of the blockchain mining device 12. The controller 86 may be connected to operate a cooling system, for example having a ventilation fan 76 and a chiller 78, to maintain the mining processor 92 within a predetermined operating range of temperature. For example, if the internal temperature within the mining device 12 spikes above a predetermined maximum predetermined temperature, the air ventilation system may initiate or ramp up, and if the temperature contains past a second, relatively higher maximum predetermined temperature, the chilling unit may initiate or ramp up to achieve an air-conditioning effect. Similarly, if the temperature drops below a minimum predetermined temperature, a heating system (not shown) may initiate that may or may not leverage the air ventilation infrastructure to distribute heat. Plural controllers may be incorporated, for example to carry out different tasks, for example one controller for temperature control and another for mining processor control. The enclosure 98 may be structured to insulate its contents from the elements. The enclosure 98 may have a back-up heating device such as a space heater (not shown), for example to be used to heat the enclosure 98 in case of shut down in cold weather.

Referring to FIG. 4, one or more controllers 86 may modulate operating power loading to operate within the varying and gradually diminishing gas supply levels provided by a remote oil well or other hydrocarbon production, storage, or processing facility. The controller 86 may be connected to modulate a power load level used by the blockchain mining device 12, for example by increasing or decreasing the mining activity, or hashrate, of the mining processor 92. The mining processor 92 may comprise a plurality of processors, and the controller 86 may be connected to modulate the operating power loading level by increasing or decreasing the number of mining processors 92 that are actively engaged in mining, such as powering down one or more mining processors 92.

Figure 5A:
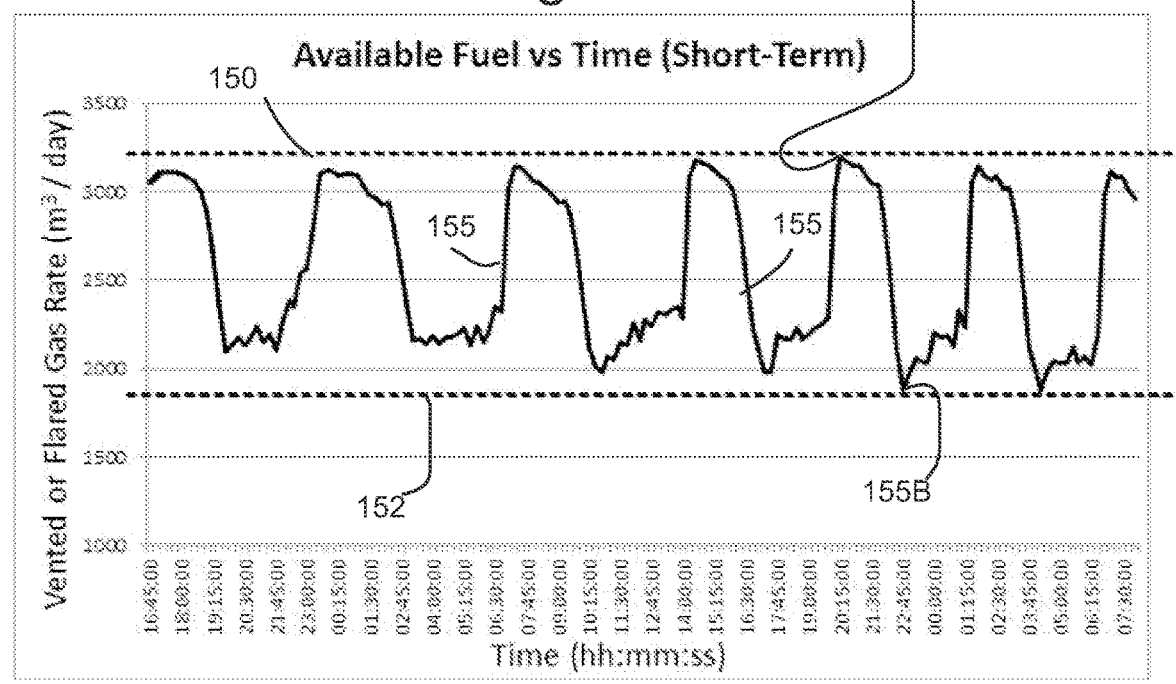
FIG. 5A is a graph that illustrates short-term changes in available natural gas produced over time by an oil production, storage, or processing facility.

The controller 86 may be connected to modulate the power load level in response to variations in a supply or production rate of natural gas from the source of natural gas, for example a production rate of the well 14. Referring to FIG. 5A, over a relatively short time period, such as a single day, the controller 86 may modulate the power load by modulating the mining activity, or hashrate, of a mining processor 92 to correspond with either or both a) readings from a production rate sensor (not shown), or b) a measured gas production time profile based on recent (for example readings taken over the last week) historical gas production readings taken from the well, such as is shown in FIG. 5A. Thus, as gas production increases, so might the controller 86 increase mining activity, or hashrate, of mining processor 92, thereby drawing more power which results in a larger power load and gas consumption of the engine 56. As gas production decreases as it is known to do in a relatively predictable and cyclical fashion as shown, the mining activity may decrease. Adjustments may be made in real time to maximize the use of the casinghead gas produced and to minimize waste of either electricity generated or excess gas sent to a disposal device.

Referring to FIG. 5A, in some cases the power load level 152 may be set in relation to a daily minimum production rate 155B of natural gas. A production rate of combustible gas from the remote oil well 14 may vary between a daily minimum production rate 155B and a daily maximum production rate 155A. At least while the production rate is above the daily minimum production rate 155B, or for a period of time of eight, twelve, twenty-four, or more hours, the controller 86 may be set to limit the power load level to at or below a power level 152 producible by the generator 28 when the production rate is at the daily minimum production rate. Thus, because the power load level is set to the minimum daily power supply from the generator 28, the controller 86 may retain a stable and consistent number of mining processors 92 in operation all day long. Venting may be decreased and little control philosophy may be required. Such a method may not completely eliminate waste such as venting however waste is reduced.

Referring to FIG. 1, while the power load level is set to the daily minimum, the excess gas or electricity may be addressed in a suitable fashion. In the example shown, excess electricity produced by the generator 28 is diverted to an electricity disposal device, in this case a load bank 32 when the production rate is above the daily minimum production rate 155B. In some cases the controller 86 or another suitable device, may divert excess gas from reaching engine 24, for example to a suitable gas disposal or storage device, such as an atmospheric vent, a flare, or other device. One or more valves, such as an instrumented valve, may be used for such diversion. In some cases excess gas sent to the engine will automatically divert to disposal through the gas tree, as such equipment may already have pressure regulation installed and set such that above a certain pressure excess gas is diverted to vent or flare. The load bank may be controlled to load up the engine so that all power generated in excess of the required amount to power the mine can be dissipated in the load bank as heat. In such a fashion the user can eliminate venting altogether as long as the engine is sized to consume the maximum available gas supply.

Referring to FIG. 5A, in some cases the power load level may be set in relation to a daily maximum production rate 155A of natural gas, with shortfall made up by a backup source of fuel or electricity. Referring to FIG. 1, the controller 86 may be set to limit the power load level 150 to above a power level producible by the generator 28 when the production rate 155 is at the daily minimum production rate 155B. In some cases the power level is set to be limited at least while the production rate 155 is above the daily minimum production rate 155B, or for another suitable time period such as eight, twelve, twenty-four or longer periods of time. The power load level may be set to at, below, or above the maximum power level producible by the generator 28 when the production rate 155 is at the daily maximum production rate 155A. A backup source, of fuel or electricity, in this case one or more of propane tanks 30A, 30B, underground fuel supply line 46, and gas outlet line 42 from production storage tank 34, may be connected make up shortfalls in fuel or electricity, respectively, required to supply the blockchain mining device 12 with the power load level. In such an example vented gas is eliminated but back-up fuel use may be increased, thus operating costs may rise relative to the daily low embodiment (embodiments where power load level is set in relation to the daily minimum production rate 155B in FIG. 5A) because of the requirement for the backup fuel or electricity source.

On a well site there may be one or more uses for produced gas, and thus the production rate of the well may be higher than the production rate of gas that arrives at the engine 24 or 56, however, due to the varying production rate, the fluctuation in the graph gives an indication of the proportional fluctuation in the actual production rate received by the engine 24 or 56 as the case may be. In some cases the engine 24 or 56 is undersized and cannot consume the maximum available gas, in which case the gas is sent to a gas disposal or storage device via pressure regulation in the gas tree and/or at the engine. The engine may comprise a throttle that permits some variation in gas consumption and power production at the engine level, and in some cases the controller 86 is set to operate the throttle. In some cases the power load level may be set in between the daily maximum and minimum production rates, with a backup energy or fuel source and a method of disposing or storing of excess gas.

Figure 5B:
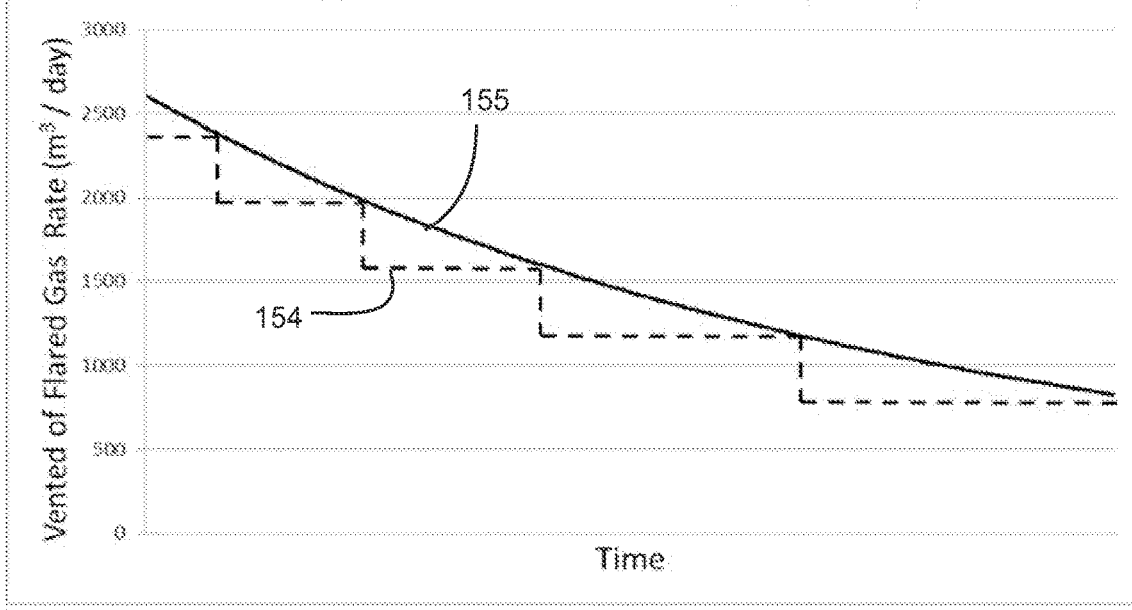
FIG. 5B is a graph that illustrates long-term changes in available natural gas produced over time by an oil production, storage, or processing facility.

Referring to FIG. 5B, the graph shows a typical scenario where gas production decreases over time. As the natural gas production rate 155 decreases, individual mining processors 92A-E may be removed or disengaged from the device 12 so that the load on the engine 24 or 56 is reduced correspondingly, thereby reducing the required natural gas consumption of the engine 24 or 56 to match or correspond with the decline in gas availability. FIG. 5B depicts an engine fuel consumption level 154 that is modulated over time in a stepped or stepdown fashion in relation to the gradually decreasing production rate 155 of the well.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A blockchain mining system connectable to a network that stores or has access to a blockchain database with transactional information for a digital currency, the blockchain mining system comprising:
a blockchain mining device structured to be connected in use to a generator that uses a continuous flow from a source of combustible gas to power the generator;
in which:
the blockchain mining device has a plurality of mining processors and is configured with a network interface;
the network interface is configured to, in use, be connected to receive and transmit data through the internet to the network;
the plurality of mining processors are connected to the network interface and adapted to mine transactions associated with the blockchain database and to communicate with the blockchain database; and
a controller of the blockchain mining system is configured to modulate a power load level exerted by the blockchain mining device on the generator in response to variations in electrical power availability from the generator.

2. The blockchain mining system of claim 1 isolated from a sales gas line and an external electrical power grid.

3. The blockchain mining system of any claim 1 further comprising the generator, which is connected to the blockchain mining device, and in which the source of combustible gas is connected to the generator and comprises a hydrocarbon production, storage, or processing facility.

4. The blockchain mining system of claim 3 in which the source of combustible gas comprises a remote oil or gas well.

5. The blockchain mining system of claim 1 further comprising a combustion engine that is connectable to the source of combustible gas and connected to drive the generator.

6. The blockchain mining system of claim 1 in which the controller is configured to modulate the power load level in response to:
a production rate of combustible gas from the source of combustible gas; or
a gas production profile of the source of combustible gas.

7. The blockchain mining system of claim 1 in which:
the controller comprises one or more controllers connectable to one or both the generator and the blockchain mining device; and
the one or more controllers are connected to the network interface for remote access.

8. The blockchain mining system of claim 1 further comprising a portable enclosure, which houses the blockchain mining device and has the form of a box with walls, a top, and a base, with one or more access doors formed in the walls.

9. The blockchain mining system of claim 1 further comprising a combustible gas disposal device, at the source of combustible gas, the combustible gas disposal device being connected to receive combustible gas from the source of combustible gas.

10. The blockchain mining system of claim 1 further comprising one or more step-down transformers, in which the blockchain mining device is connected to receive power from the one or more step-down transformers.

11. The blockchain mining system of claim 1 further comprising the generator, in which the generator comprises a plurality of generators.

12. The blockchain mining system of claim 1 in which the controller is configured to modulate the power load level by increasing or decreasing one or more of:
a maximum number of the plurality of mining processors that are engaged in mining transactions, by powering up or down one or more of the plurality of mining processors; or
a mining activity of one or more of the plurality of mining processors by modifying a hashrate and corresponding power consumption of the one or more of the plurality of mining processors.

13. The blockchain mining system of claim 12 in which the controller is configured to increase or decrease the maximum number of the plurality of mining processors that are engaged in mining transactions by connecting or disconnecting the internet to and from the one or more of the plurality of mining processors.

14. The blockchain mining system of claim 1 in which the blockchain mining device is connected to the generator, which is connected to the source of energy to receive a continuous supply of energy to power the generator and provide electricity to the blockchain mining device.

15. A blockchain mining method for mining transactions for a network that stores or has access to a blockchain database that stores transactional information for a digital currency, the blockchain mining method comprising:
  using a source of combustible gas to produce electricity via a generator to operate a blockchain mining device, in which:
    the generator is connected to the source of combustible gas to receive a continuous flow of combustible gas to power the generator;
    the blockchain mining device has a plurality of mining processors and is connected to a network interface;
    the network interface is connected to receive and transmit data through the internet to the network;
    the plurality of mining processors are connected to the network interface and adapted to mine transactions associated with the blockchain database and to communicate with the blockchain database; and
  modulating, using a controller, a power load level exerted by the blockchain mining device on the generator in response to variations in electrical power availability from the generator.

16. The blockchain mining method of claim 15 further comprising, prior to using the source of combustible gas:
  disconnecting or diverting the source of combustible gas from a combustible gas disposal device at a hydrocarbon production well, storage, or processing facility; and
  connecting the source of combustible gas to operate the blockchain mining device.

17. The blockchain mining method of claim 16 in which the combustible gas disposal device comprises one or more of a flare, a vent to the atmosphere, an incinerator, or a burner.

18. The blockchain mining method of claim 15 in which modulating comprises modulating the power load level in response to:
  a production rate of combustible gas; or
  a gas production profile of the combustible gas.

19. The blockchain mining method of claim 15 in which using the controller comprises using one or more controllers to operate one or both the generator and the blockchain mining device.

20. The blockchain mining method of claim 19 in which the one or more controllers are connected to the network interface for remote access.

21. The blockchain mining method of claim 15 further comprising using one or more step-down transformers to supply power from the generator to the blockchain mining device.

22. The blockchain mining method of claim 15 in which the generator comprises a plurality of generators.

23. The blockchain mining method of claim 15 in which modulating further comprises modulating by increasing or decreasing one or more of:
  a maximum number of the plurality of mining processors that are engaged in mining transactions, by powering up or down one or more of the plurality of mining processors; or
  a mining activity of one or more of the plurality of mining processors by modifying a hashrate and corresponding power consumption of the one or more of the plurality of mining processors.

24. The blockchain mining method of claim 23 in which the controller is configured to increase or decrease the maximum number of the plurality of mining processors that are engaged in mining transactions by connecting or disconnecting the internet to and from the one or more of the plurality of mining processors.

* * * * *